US008046091B2

(12) United States Patent
Yasui

(10) Patent No.: US 8,046,091 B2
(45) Date of Patent: Oct. 25, 2011

(54) CONTROL PARAMETERS FOR SEARCHING

(75) Inventor: Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 27 days.

(21) Appl. No.: 12/081,897

(22) Filed: Apr. 23, 2008

(65) Prior Publication Data

US 2008/0288091 A1 Nov. 20, 2008

(30) Foreign Application Priority Data

Apr. 25, 2007 (JP) ................................ 2007-116054

(51) Int. Cl.
*G05B 13/02* (2006.01)
*F02D 11/10* (2006.01)

(52) U.S. Cl. .............. 700/32; 123/399; 700/28; 700/31; 700/37; 700/42

(58) Field of Classification Search .................... 700/31, 700/32, 42, 28, 37; 123/399
See application file for complete search history.

(56) References Cited

U.S. PATENT DOCUMENTS 4,214,300 A * 7/1980 Barlow et al. .................. 700/32
4,448,162 A * 5/1984 Ninomiya et al. ....... 123/406.23
4,602,326 A * 7/1986 Kraus ............................ 700/38
4,903,210 A * 2/1990 Akasu .......................... 701/111
5,166,873 A * 11/1992 Takatsu et al. .................. 700/31
5,394,322 A * 2/1995 Hansen .......................... 700/37
5,406,474 A * 4/1995 Hansen .......................... 700/37
5,583,755 A * 12/1996 Ichikawa et al. ................ 700/37
5,587,896 A * 12/1996 Hansen et al. .................. 700/28
5,609,136 A * 3/1997 Tuken ........................... 123/357
5,697,867 A * 12/1997 Kono et al. ................... 477/176
5,726,880 A * 3/1998 Bailey et al. ................... 700/72
5,731,688 A * 3/1998 Thomson ........................ 322/22
6,079,205 A * 6/2000 Yasui et al. ..................... 60/276
6,415,272 B1 * 7/2002 Ulyanov ........................... 706/2
6,497,223 B1 * 12/2002 Tuken et al. .................. 123/497
(Continued)

FOREIGN PATENT DOCUMENTS

JP 62162102 A * 7/1987
(Continued)

OTHER PUBLICATIONS

Kartik B. Ariyur et al., "Real-Time Optimization by Extremum-Seeking Control", A John Wiley & Sons, Inc., Publication, 2003, pp. v-xi, a total of 10 sheets.

*Primary Examiner* — Albert Decady
*Assistant Examiner* — Thomas Stevens
(74) *Attorney, Agent, or Firm* — Squire, Sanders & Dempsey (US) LLP

(57) ABSTRACT

An optimum control parameter in control of an internal combustion engine and the like is searched. In a plurality of search cycles, a control parameter that maximizes an output of an object to be controlled which shows an output realized by a given control parameter is searched using control parameters. The control parameters are provided at each search cycle by a predetermined algorithm. A periodic function of a predetermined period and a correction value obtained in a previous search cycle are added to the control parameters to obtain an input parameters to the object. An output obtained from the object with the input parameters is multiplied by the periodic function to obtain a correction value for correcting the control parameters such that the search converges.

18 Claims, 28 Drawing Sheets

U.S. PATENT DOCUMENTS 6,783,080 B2 * 8/2004 Antoniou et al. ........... 236/78 D
6,985,809 B2 * 1/2006 Yasui ............................ 701/109
7,050,864 B2 * 5/2006 Yasui et al. ..................... 700/31
7,257,522 B2 * 8/2007 Hagiwara et al. ................. 703/8
7,346,403 B2 * 3/2008 Tanaka et al. ................... 700/52
7,383,235 B1 * 6/2008 Ulyanov et al. ................. 706/13
7,592,766 B2 * 9/2009 Patel et al. ............... 318/400.02
2005/0119791 A1 * 6/2005 Nagashima ................... 700/253
2006/0064181 A1 * 3/2006 Kato ............................... 700/42
2007/0290648 A1 * 12/2007 Shimojo et al. ............... 318/565
2008/0097683 A1 * 4/2008 Yasui et al. ................... 701/104

FOREIGN PATENT DOCUMENTS

JP 2000-035379 2/2000

* cited by examiner (a) TOP VIEW (b) STEREOSCOPIC VIEW

CONTROL PARAMETERS FOR SEARCHING

BACKGROUND OF THE INVENTION

1. Field of the Invention

The present invention relates to a technique for searching control parameters.

2. Description of the Related Art

Japanese Patent Application Publication No. 2000-35379 shows, as an internal combustion engine controller, a hardware configuration for automatically measuring performance characteristic of an engine. However, this document only shows a system configuration for automatically measuring engine performance, with which human labor can be alleviated, but the number of control parameters is enormous and the number of measurement points thus becomes large. Therefore, this configuration cannot meet a recent need for measuring engine performance characteristics in a shorter period of time.

Further, in the "CAMEO system" of AVL List GmbH (Australia), engine performance is automatically measured by the use of an experimental design method. In this system, the number of measurement points of engine performance is reduced by the experimental design method, reducing the measuring time. However, in the case of applying this to measurement of an engine which has been undergoing drastic changes with respect to control parameters, extreme reduction of the number of measurement points might make it impossible to accurately observe irregular changes in engine performance. Therefore, it is practically not possible to sufficiently reduce the number of measurement points. Moreover, since approximate positions of variation points of engine performance need be previously entered for automatic measurement, it is difficult to perform automatic measurement of an engine for which no measurement was done in the past.

Since a currently used engine has a large number of variable devices such as a universal moving valve system, a direct fuel injection system capable of injecting fuel several times in one combustion cycle, and a variable geometry supercharger, the number of command values given to those devices, namely combinations of control parameters, has become enormous.

Hence it is necessary to measure combination conditions of an enormous number of combinations of control parameters for obtaining engine performance characteristics, which is time-consuming. It is further necessary to perform measurement in various conditions in order to optimize a combination of a plurality of control parameters for each of evaluation indexes (fuel consumption, output, emission).

Accordingly, a combination of control parameters is determined in a grid shape as shown in FIG. 1 by the use of the experimental design method, and automatic measurement is performed with the control parameters automatically held at respective set values.

In a conventional automatic measurement method shown in FIG. 2, a sequence has been adopted in which, after a change in control parameter, measurement is halted until performance data is stabilized, and measurement is performed in a subsequent predetermined period of time. Hence it takes several tens of seconds to several minutes to measure performance for one measurement point (combination of control parameters). Therefore, even with the use of the experimental design method, the effect of reducing the number of measurement points (combinations of control parameters) is not sufficient, and it takes time as long as several weeks to several months to obtain engine performance in all conditions.

Moreover, the engine characteristic as described above has a highly complicated curved surface with projections and depressions relative to control parameter as shown in FIG. 3, and its changes are very abrupt. For this reason, when the number of measurement points is significantly reduced by the use of the experimental design method, it becomes impossible to catch the projections and depressions characteristics and peak points of actual engine characteristics as shown in FIG. 4. Especially when a missed peak point is the optimum value of performance that should be captured, the measurement is useless since the engine performance cannot be maximized. Accordingly, the technique based on the experimental design method that has been used in automatic measurement devices cannot practically reduce the number of measurement points and cannot shorten measuring time. In other words, when the number of measurement points is reduced, it is likely that an optimum point is missed, and that projections and depressions characteristics are missed.

Hence, in order to reduce the number of measurement points, there has been proposed a technique for searching an optimum value Pa shown in FIG. 4 by not setting a control parameter A as a condition of measurement points, and by setting the other parameters at fixed values and changing (or seeping) the parameter A only to search maximum/minimum points (hereinafter referred to as sweep method). A peak value can be searched with this technique when performance data has a single peak (MBT characteristic of ignition, etc.) as shown in FIG. 5A. However, when the performance data has a plurality of peaks as shown in FIG. 5B, searched peak value differs depending upon the sweeping direction and the starting point of the control parameter. This causes a so-called local minimum problem that has been on issue in terms of an optimization problem.

As a technique for searching such an extremum, an Extremum Seeking algorithm is known. "Real-Time Optimization by Extremum-Seeking Control" by Kartik B. Ariyur, Miroslav Krstic (Wiley-Interscience, 2003/09) is a reference book on Extremum Seeking, containing more than 200 pages.

Unfortunately, currently used automatic driving devices (AVL CAMEO) may need information about where the peak is likely to lie even in the case of single peak characteristics. No device can solve the local minimum problem.

Further, sweeping a single control-parameter is the limit in the current conditions. Sweeping a plurality of parameters has been difficult in the currently used automatic driving devices since it leads to more frequent occurrence of the local minimum problem and makes it more difficult to previously predict the position of the peak point.

In some cases, only an optimum value Pa as shown in FIG. 4 is desired to be obtained in the engine performance measurement. In such cases, in the conventional technique, engine performance is measured in a plurality of conditions as illustrated in FIG. 4, and after the measurement has been completed, an optimization process based on a plurality of pieces of measurement data is performed to ascertain the optimum value Pa. Therefore, for obtaining the optimum value Pa as quickly as possible, it is desirable to directly search the optimum value Pa, and measure performance data at the optimum value Pa.

As such, an automatic measurement device having characteristics as described below has been desired in order to obtain more sophisticated engine performance characteristics accurately and to reduce measuring time:

being capable of searching the optimum point even when the engine performance characteristic has a plurality of peaks (where a local minimum exists);

being capable of varying a plurality of control parameters to search the optimum point of the engine performance data; and not requiring pre-data such as a place where the optimum point exists for searching the optimum point.

SUMMARY OF THE INVENTION

Accordingly, an automatic measurement device for an internal combustion engine is required which is capable of accurately obtaining more sophisticated engine performance characteristics and reducing the measuring time for that obtain.

In order to solve the above-mentioned problems, the present invention provides a maximum value searching scheme for searching in a plurality of search cycles a control parameter that maximizes an output of an object to be controlled which shows an output realized by a given control parameter in accordance with the control parameter. The computer program with this scheme allows a computer to perform a function of providing the control parameter at each search cycle by a predetermined algorithm, a function of adding a periodic function of a predetermined period and a correction value obtained in a previous search cycle to the control parameter, to obtain an input parameter to the object to be controlled. The program further performs a function of multiplying an output, obtained from the object to be controlled in accordance with the input parameter, by the periodic function, to obtain a correction value based on an integral value of the value obtained by the multiplication, for correcting the control parameter such that search is converged, and a maximum value search function of repeating the search cycle in search for an input parameter that maximizes an output of the object to be controlled, to extract the input parameter that maximizes the output of the object to be controlled.

It is thereby possible to search the input parameter that achieves a maximum value with higher probability even when the object to be controlled has a characteristic of having a plurality of maximum values.

According to one aspect of the present invention, an integration period of the integral value is an integral multiple of the period of periodic function.

It is thereby possible to suppress periodic behavior of the periodic function added to the input parameter from causing the searched input parameters vibrates, thereby improving searching accuracy of the input parameter that achieves a maximum value.

According to another aspect of the present invention, the periodic function has different periods respectively for a plurality of control parameters, and the integration period of the integral value is a time period of a common multiple of the periods of all the periodic functions.

It is thereby possible to prevent an input parameter from showing a vibrating behavior due to a periodic behavior of the periodic functions added to the other input parameters, thus improving searching accuracy of the input parameter that gives a maximum value out of a plurality of input parameters.

According to further another aspect of the present invention, the control parameter is determined by a genetic algorithm, and an update of DNA (individual) in the genetic algorithm is performed based on an output of the object to be controlled which was searched using the input parameter. The probability of ascertaining an input parameter is enhanced that gives a maximum value even when the object to be controlled has a plurality of peak values (relative maximum values).

Moreover, in one aspect of the present invention, the genetic algorithm constructs next generation DNA using the input parameter that maximizes an output of the object to be controlled which has been searched based on current generation DNA. It is thereby possible to significantly reduce the number of searching steps and search the input parameter that achieves a maximum value.

In one aspect of the present invention, an object of the maximum value searching is an internal combustion engine. In searching an optimum point of engine performance having sophisticated characteristics (of having a plurality of maximum values), the optimum point can be searched more accurately in a shorter period of time than in the conventional technique using the experimental design method, without using manpower. Further, in measuring engine performance, automatic measurement can be performed without requiring previous information of the engine performance.

Other characteristics and advantages of the present invention are apparent from the following detailed descriptions.

DETAILED DESCRIPTION OF THE PREFERRED EMBODIMENTS

Figure 7:
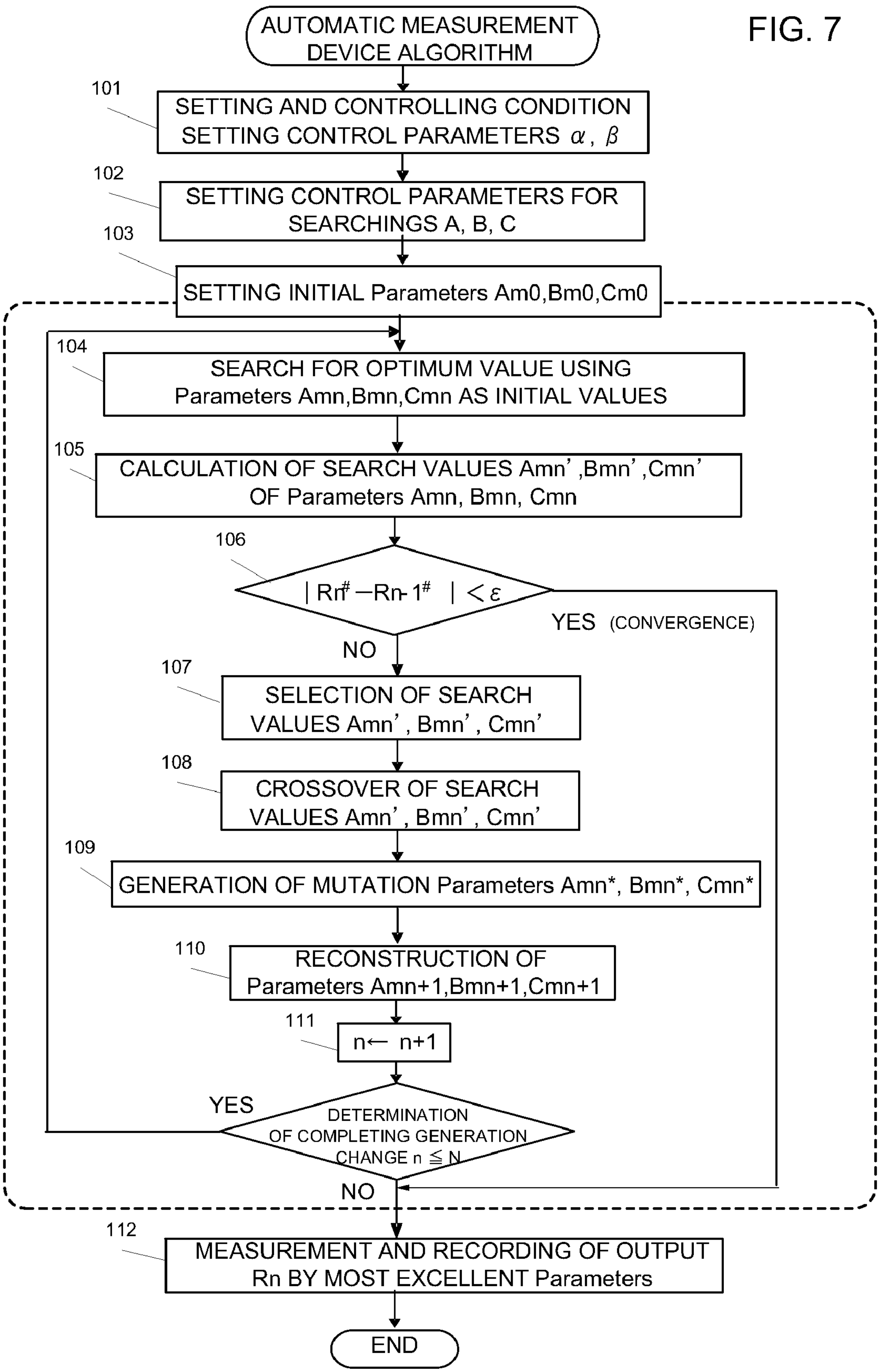
FIG. 7 is a view showing a new automatic measurement algorithm.

In the following, embodiments of the present invention are described with reference to drawings. FIG. 7 is a flowchart showing an automatic measurement algorithm in accordance with one embodiment of the present invention.

This algorithm is a combination of a genetic algorithm (hereinafter referred to as GA) and Extremum Seeking, and performs rough optimization by determining an initial value of Extremum Seeking with GA and searching an optimum value with Extremum Seeking, the optimum value becoming a parent for producing next generation DNA in the GA.

The details of each step of the algorithm in FIG. 7 are described below.

STEP 101: Setting and Controlling of Control Parameters for Setting Conditions Control parameters other than those for performing variable control in real time (hereinafter referred to as control parameters for setting conditions) $\alpha$ and $\beta$ are set at the time of automatic measurement, and the respective parameters are held at set values. Embodiments of the control parameters for setting conditions at this time include an engine rotational speed and an air-fuel ratio, and these parameters are held at set values by operating with PID control or sliding mode control a control amount (engine torque, etc.) of a measurement device and inputs (throttle opening, fuel jet amount, etc.) to the object to be controlled, that is an object for search (hereinafter refereed to as object for search). While the control parameters for setting conditions are held at the set values, the optimum value of control parameters for real time variable control that maximizes the output of the object for search is obtained.

STEP 102: Setting of Control Parameters for Searching

Control parameters, which perform variable control in real time at the time of automatic measurement, (hereinafter referred to as control parameters for searching) A, B and C are defined. Embodiments of the control parameters for searching include an EGR ratio, ignition timing and supercharge pressure.

Step 103: Setting of Initial DNA

Figure 6:
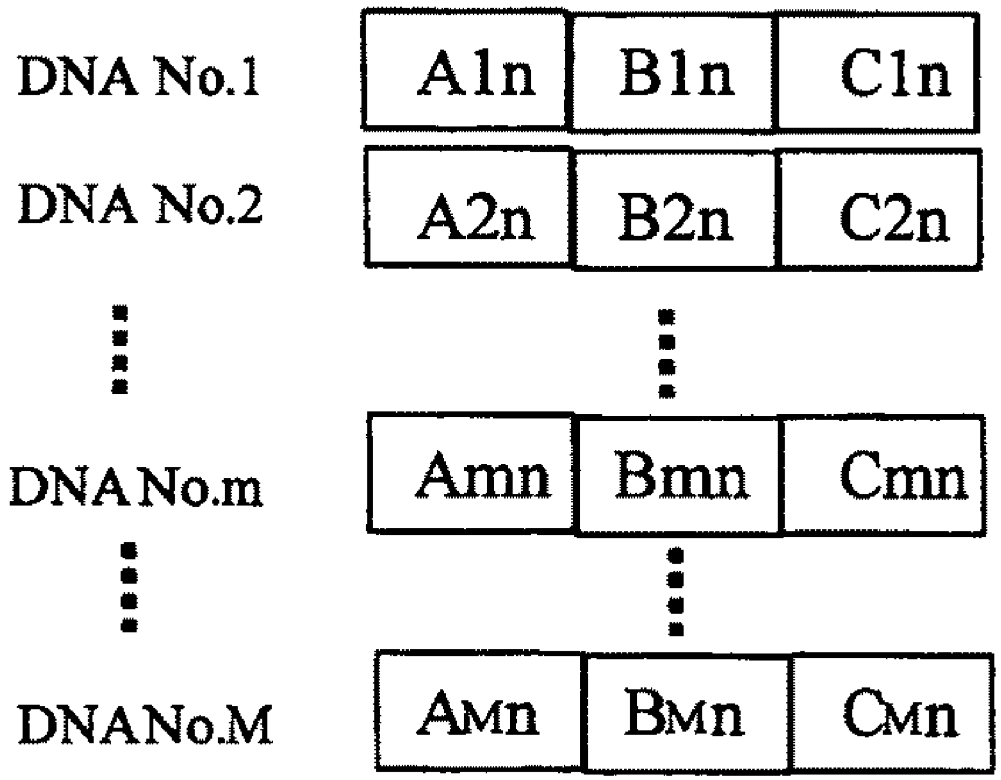
FIG. 6 is a view showing genetic codes with respects to control parameters for searching A, B and C.

DNA codes are defined by Amn, Bmn, and Cmn 11 for control parameters for searching A, B, and C as shown in FIG. 6. m is a numeral value representing DNA individual, and 1 to 8 in this embodiment. N is a numeral value representing a generation, and is 1 to 50 in this embodiment. Namely, in this embodiment, there are eight DNA's in one generation, and control parameters are searched up to the 50th generation. As an initial value of the DNA code, a value may be generated as a random number, or may be an experientially obtained value.

STEP 104: Optimum Value Searching with DNA as Initial Value

Here, the object for search is an engine, and inputs U1, U2 and U3 are entered to the object for search with the control parameters for searching A, B and C to produce an output Y (e.g. engine torque, emission reducing amount, engine efficiency, etc.) from the object for search.

Figure 8:
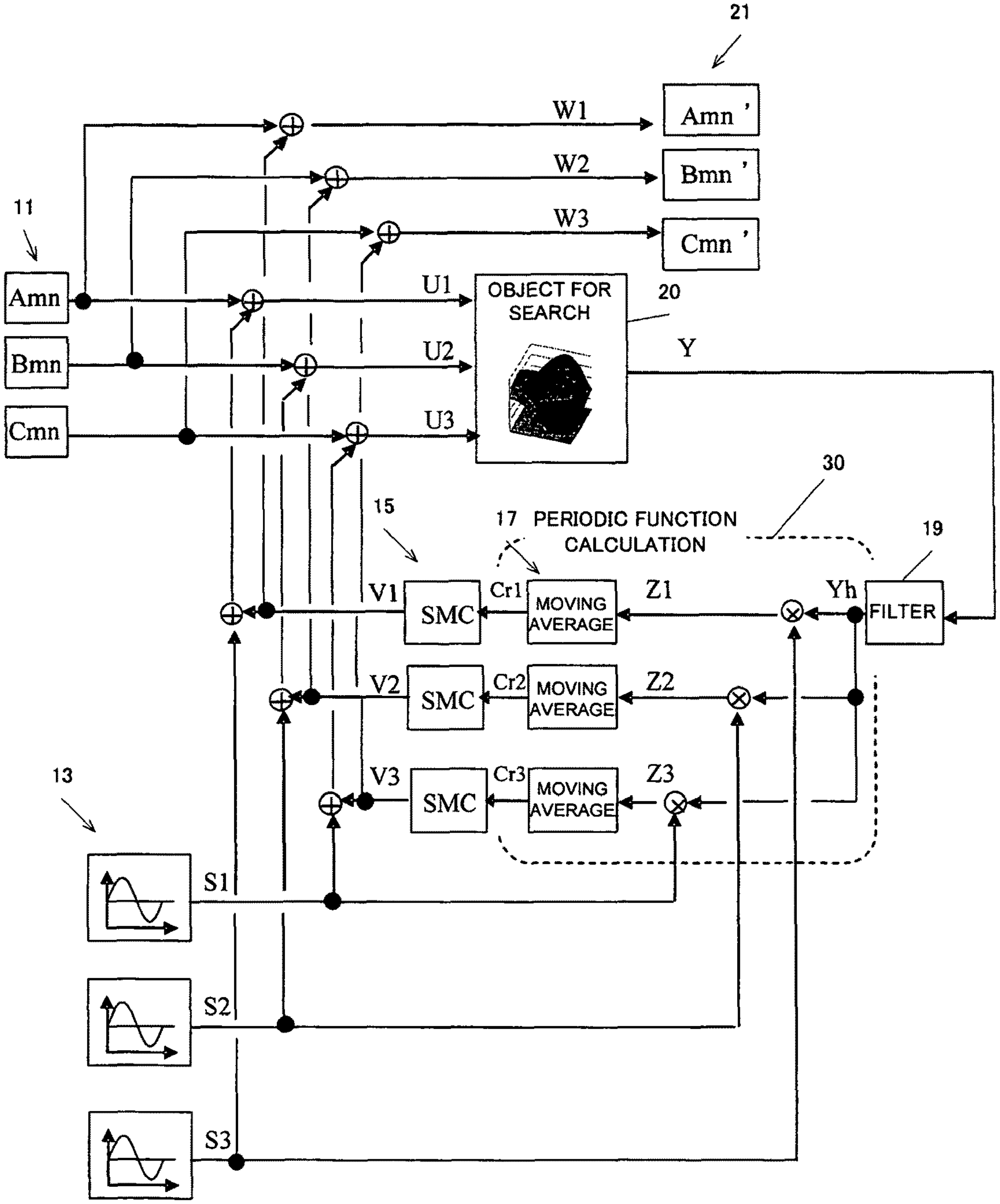
FIG. 8 is a view showing a modified type Extremum Seeking algorithm.

FIG. 8 is a functional block diagram of a system which executes an Extremum Seeking algorithm for searching a relative maximum value of the output Y, using the DNA defined in STEP 103 as the initial value of the control parameters. While relative maximum value is searched here, for searching a relative minimum value, the output Y of the object for search may be set to "−Y" or "1/Y".

This system can be realized by programming a general-purpose computer. This computer is provided with a processor (CPU), a random access memory (RAM) which provides the CPU with a working area, and a read-only memory (RAM) which stores computer programs and data.

The inputs U1, U2 and U3 to an object 20 in this embodiment of the present invention are obtained by the following expressions. Here, a sliding mode controller and the genetic algorithm are applied to the Extremum Seeking algorithm.

$$U1(k)=V1(k)+S1(k)+Amn$$

$$U2(k)=V2(k)+S2(k)+Bmn$$

$$U3(k)=V3(k)+S3(k)+Cmn \qquad (2\text{-}1)$$

Figure 9:
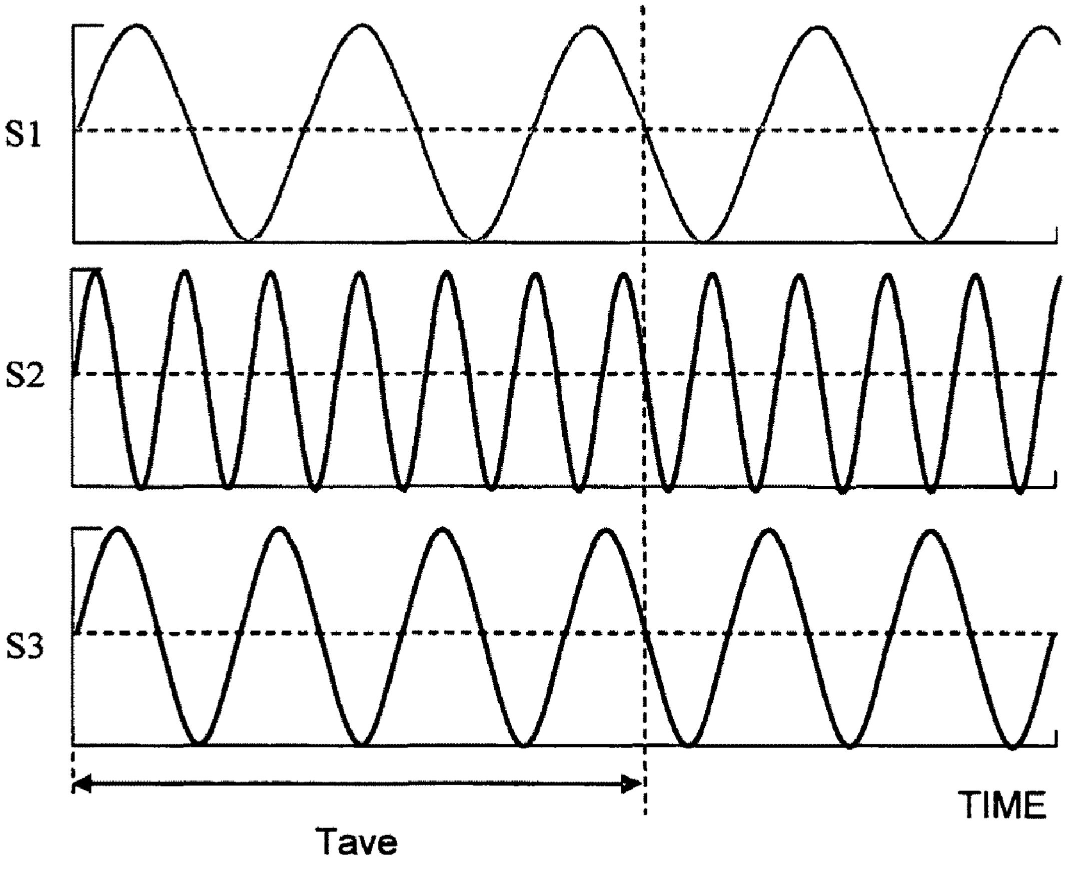
FIG. 9 is a view showing reference signals.

Here, Vi is a control input value of a sliding mode controller 15 set for an input Ui, and i=1 to 3 in this embodiment. Si is a reference input and, as shown in FIG. 9 for embodiment, is a periodic function 13 whose period cannot be divided by (is not a multiple number of) a period of each other. The amplitude may be the same, and may be set as appropriate in accordance with a frequency gain characteristic of the object 20, e.g. the shorter the period is, the larger the amplitude is made.

A function of a filter 19 is represented by the following expression:

$$Yh(k)=-0.5Yh(k-1)+0.5Y(k) \qquad (2\text{-}2)$$

The filter 19 serves to extract a change in output Y for a change in input Ui, removes a stationary component and has a characteristic of passing the period of the reference input Si. A high pass filter or a band pass filter for passing the period of the reference input Si may be set for each input.

A correlation function calculating unit 30 calculates a correlation function value Cri as a value obtained by a moving-average function 17 over a zone K, a multiplication value Zi of the reference input Si, and a filtering value Yh.

$$Zi(k) = Yh(k)Si(k-1) \quad (i = 1 \text{ to } 3) \qquad (2\text{-}3)$$

$$Cri(k) = \sum_{j=0}^{K} Zi(k-j) \qquad (2\text{-}4)$$

When a calculation period is defined as ΔT (e.g. 10 msec) a common multiple of the periods of all reference inputs is defined as Tave, a moving average zone K can be defined as K=Tave/ΔT−1.

By determination of K in this manner, the frequency component of the reference input can be removed from Cri, and when the correlation of the input Ui and the output Y is constant, Cri can be calculated as a constant value. This is one of advantages of the technique of the present invention with respect to typical Extremum Seeking, and Wi (later described Expression 2-9) ultimately desired to be calculated can be made a stable value with the frequency component of the reference input removed therefrom, thereby enabling improvement in speed and stability of convergence for optimization while using the GA as compared with typical Extremum Seeking.

The sliding mode controller (SMC) 15 calculates a correction value Vi to be added to the input for converging the correlation function value Cri toward a predetermined value:

$$\sigma i(k)=Cri(k)+SCri(k-1)(i=1 \text{ to } 3) \quad (2\text{-}5)$$

Expression 2-5 is called a switching function, defining a converging characteristic of the correlation function value Cri. Since the correlation function value Cri is desired to converge toward 1, when a setting parameter S of the switching function is, for embodiment, set to −0.8 where −1<S<0 and σi(k) is set to zero, expression 2-5 becomes a straight line passing through an original point of a two-dimensional coordinate with Cri(k−1) as the X axis and Cri(k) as the Y-axis. This straight line is called a switching straight line. The sliding mode control adds a correction value Vi(k) obtained by the next expression to the control parameter as a control input so that Cri is confined on the switching straight line and converges without being affected by disturbance or the like. Details of the sliding mode control are described in Japanese Patent Application Publication No. 2002-233235, a patent application by the same applicant as this application.

$$Vrchi(k) = Krchi \times \sigma(k) \quad (2\text{-}6)$$

$$\begin{aligned} Vadpi(k) &= \text{Vi\_L} - Vrchi(k) \quad (2\text{-}7)\\ &\quad (Vrchi(k) + Vadpi(k-1) + Kadpi \times \sigma i(k) < \text{Vi\_L})\\ &= Vadpi(k-1) + Kadpi \times \sigma i(k)\\ &\quad (\text{Vi\_L} \le Vrchi(k) + Vadpi(k-1) + Kadpi \times \sigma i(k) \le \text{Vi\_H})\\ &= \text{Vi\_H} - Vrchi(k)\\ &\quad (\text{Vi\_H} \le Vrchi(k) + Vadpi(k-1) + Kadpi \times \sigma i(k)) \end{aligned}$$

$$Vi(k) = Vrchi(k) + Vadpi(k) \quad (2\text{-}8)$$

Expression 2-6 represents a reaching rule input for moving the correlation function value Cri to lie on the switching straight line. Krchi is a feedback gain of the reaching rule, which is predetermined based on simulation and the like with the stability, speed, etc. of convergence to the switching straight line taken into consideration.

Expression 2-7 is an adaptation rule input for suppressing modeling errors, disturbances and the like, which moves the correlation function value Cri to lie on the switching straight line. Kadpi is a feedback gain of the adaptation rule, which is predetermined based on simulation and the like with the stability, speed, etc. of convergence to the switching straight line taken into consideration. Vi_L and Vi_H are limit values with respect to Ui.

Expression 2-8 gives a correction value to be added to the input to the object 20 for convergence of the correlation function value Cri.

Although a sliding mode controller SMC 15 is used in this embodiment, in place of this, an algorithm of PI control, back stepping control or the like can be used to calculate the correction value Vi. A control capable of specifying a convergence behavior of deviation (here, Cri) as a non-overshot exponential behavior, such as the sliding mode control and the backstepping control, is more appropriate than a control prone to occurrence of overshooting such as the PI control, since it is more resistant to occurrence of interference with another Vi (vibrating behavior).

STEP 105: Calculation of Search Values Amn', Bmn' and Cmn'

With reference to FIG. 8, in the Extremum Seeking algorithm, values W1, W2 and W3 of control parameters for searching not including the reference input Si are calculated by the following expressions:

$$W1(k)=V1(k)+Amn$$

$$W2(k)=V2(k)+Bmn$$

$$W3(k)=V3(k)+Cmn \quad (2\text{-}9)$$

As for respective DNA individual (m=1 to M), values of Wi at a lapse of a predetermined time ($k_{end}$) are search values Amn', Bmn', and Cmn' 21 of the Extremum Seeking algorithm.

One DNA individual, e.g. DNA No. 1 made of A11, B11 and C11, is repeatedly searched during the $k_{end}$ time period with the correction value V updated, and W1, W2 and W3 are obtained at a lapse of $k_{end}$. The same calculation is performed on each DNA individual in one generation.

$$Amn'=W1(k_{end})$$

$$Bmn'=W2(k_{end})$$

$$Cmn'=W3(k_{end}) \quad (2\text{-}10)$$

When Wi and Y have become smaller in variation (converged), values of Wi at that time may be made as Amn', Bmn' and Cmn'. In this case, when the state of "|Y(k)+Y(k−1)|<δ" continues for a predetermined period of time (Tconv), the values of Wi are defined as Amn', Bmn' and Cmn'. δ is a convergence determining threshold, and Tconv is convergence determining time.

$$Amn'=W1(k)$$

$$Bmn'=W2(k)$$

$$Cmn'=W3(k) \quad (2\text{-}11)$$

Rmn←Output Y by search values Amn', Bmn' and Cmn' (2-12)

Figure 10:
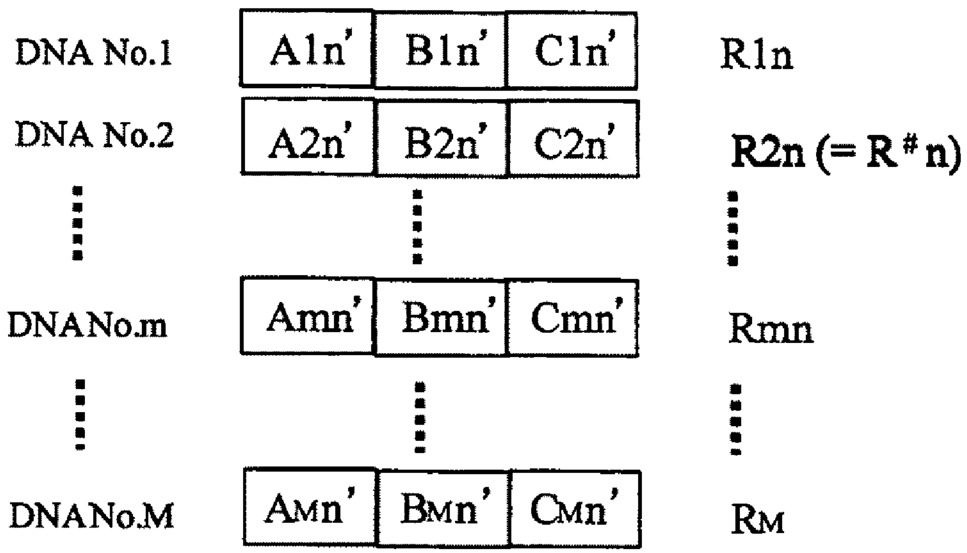
FIG. 10 is a view showing replaced genetic codes.

As shown in FIG. 10, the DNA of the initial values Amn, Bmn and Cmn is replaced by the DNA of Amn', Bmn' and Cmn'. The output Y realized by the search values Amn', Bmn' and Cmn' is defined as Rmn, and a maximum value among Rmn's is represented by $R^{\#}n$. Further, control parameters that realize $R^{\#}n$ are represented by $A^{\#}n$, $B^{\#}n$ and $C^{\#}n$. In the embodiment of FIG. 10, R2*n* is considered as maximal and represented by $R^{\#}n$. Moreover, control parameters A2*n*', B2*n*' and C2*n*' which constitute DNA No. 2 are represented by $A^{\#}n$, $B^{\#}n$ and $C^{\#}n$. Namely, $A^{\#}n$, $B^{\#}n$ and $C^{\#}n$ are optimum search values, namely optimum DNA, in the generation n.

STEP 106: Evaluation of Output $R^{\#}n$ by Most Excellent DNA

The conversing state of the algorithm in FIG. 7 is determined by whether or not an absolute value of a difference between the output $R^{\#}n$ in the generation n and a value $R^{\#}n-1$ in a previous generation n−1 is smaller than a predetermined value, and when convergence has taken place, the process proceeds to STEP 112. Namely, convergence is determined to have been completed when the relation of the following expression is established.

$$|R^{\#}n-R^{\#}n-1|<\epsilon \quad (2\text{-}13)$$

STEP 107: Selection of Search Values Amn', Bmn' and Cmn'

Figure 11:
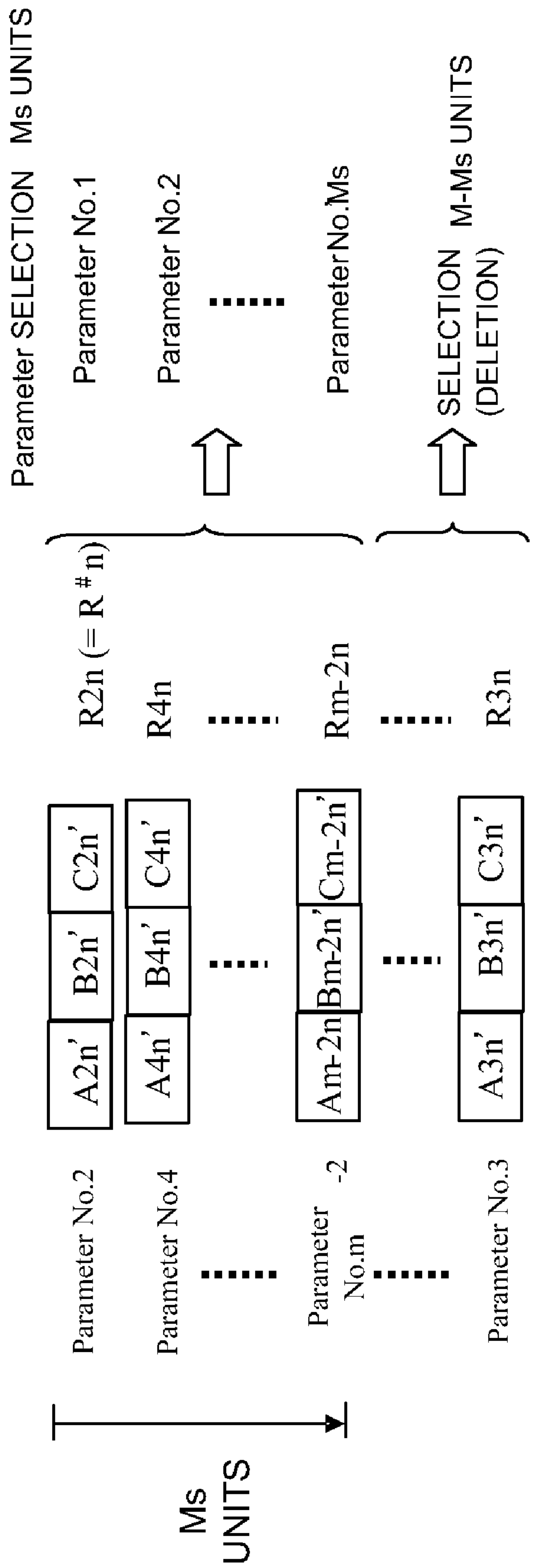
FIG. 11 is a view showing a selecting process.

A DNA group replaced by the search values Amn', Bmn' and Cmn' shown in FIG. 10 is sorted according to the respective corresponding values of Rmm in descending numeric order as shown in FIG. 11, and the top Ms units of DNA are selected and newly allocated with numbers 1'to Ms'. Subsequently, the bottom M-Ms units of DNA are deleted (selected out). Ms may be determined based on a random number, or can be a predetermined value.

STEP 108: Crossover of Search Values Amn', Bmn' and Cmn'

Figure 12:
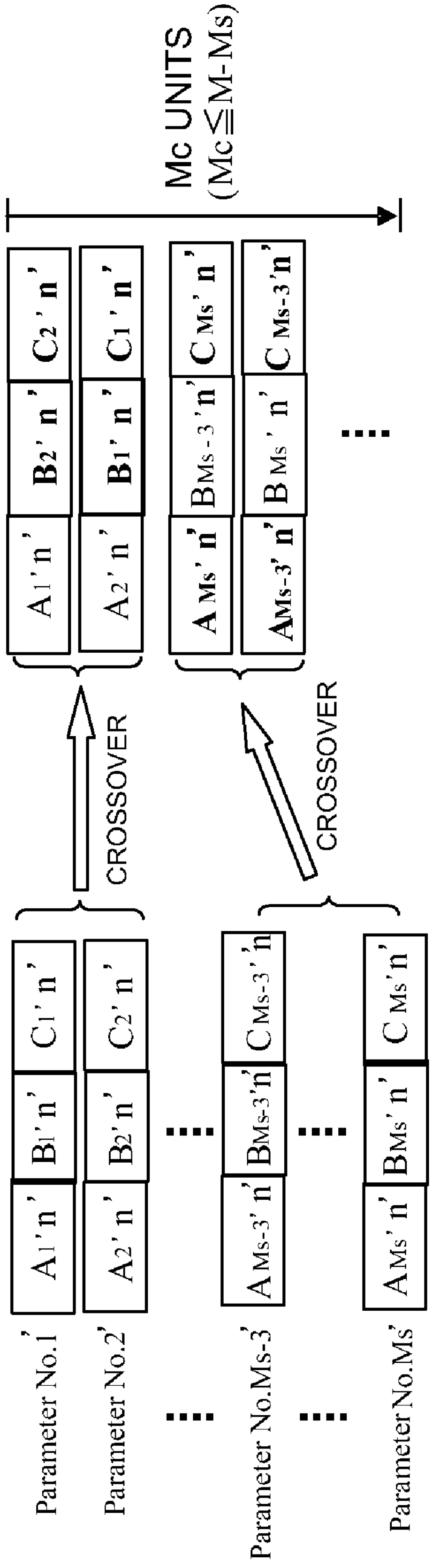
FIG. 12 is a view showing a crossover process.

As shown in FIG. 12, pairs selected from DNA No. 1' to No. Ms' selected in STEP 107 based on random numbers or a predetermined rule (e.g. from the top to Mc), individual pairs are generated by exchanging (crossover) contents of DNA. In the embodiment of FIG. 12, DNA No. 1' and DNA No. 2' have been chosen as a pair, and elements B and C of DNA have been exchanged to generate new DNA. Further, DNA No. Ms−3' and DNA No. Ms' are chosen as a pair, and elements A and C of DNA are exchanged to generate new DNA. By this process, Mc pieces Mc≦M−Ms) of DNA are generated. Mc is not larger than the number of DNA deleted in the selection step, STEP 107. The DNA element exchanging manner may be determined based on random numbers, or may follow a predetermined rule (e.g. exchanging DNA to the front and rear of Mc-th DNA).

STEP 109: Generation of Mutation of DNA Amn*, Bmn* and Cmn*

Figure 13:
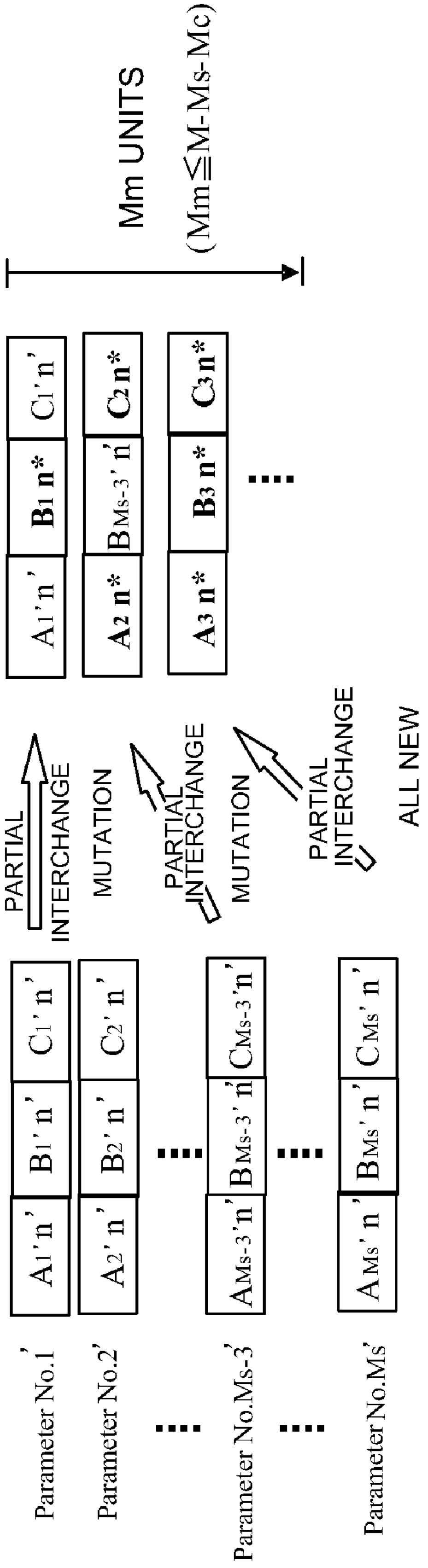
FIG. 13 is a view showing mutation.

As shown in FIG. 13, one or a plurality of Mm pieces (Mm<M−Ms−Mc) of DNA are chosen based on random numbers or a predetermined rule (e.g. from the top to Mc) from the DNA selected in STEP 107, and contents of part of the chosen DNA are exchanged by contents determined by means of random numbers to generate new DNA. This process is called mutation. In the embodiment of FIG. 13, an element $B_1$n' of DNA No. 1' have been replaced by a different element Bin* to generate a new DNA, and an element $A_{Ms-3}$n' and an element $C_{Ms-3}$n' of DNA No. Ms-3' have been replaced by different elements $A_2n^*$ and $C_2n^*$ to generate a new DNA. Further, all elements of DNA No. Ms' have been replaced by different elements to generate a new DNA.

STEP 110: Reconstruction of DNA Amn+1. Bmn+1 and Cmn+1

Figure 14:
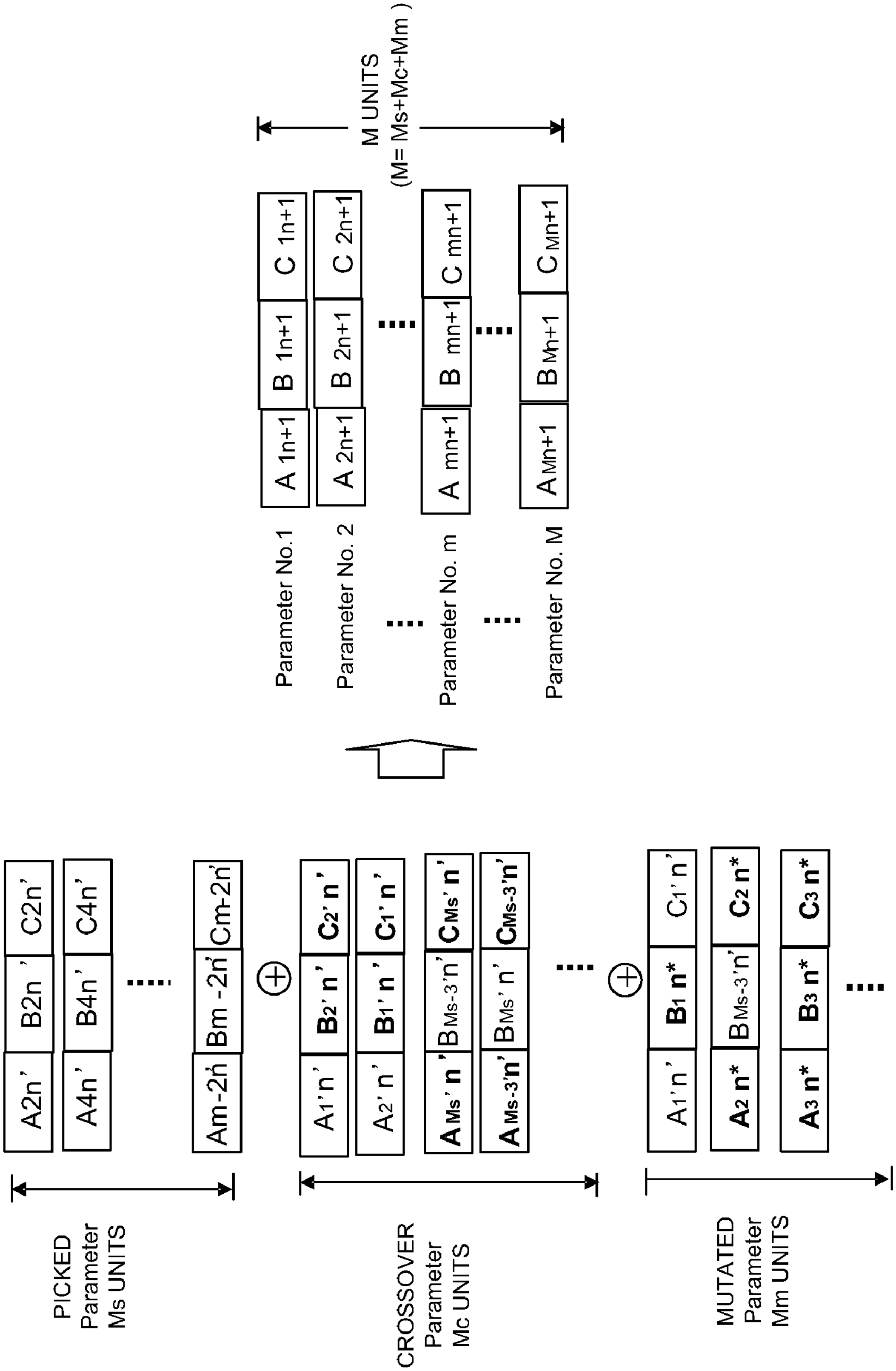
FIG. 14 is a view showing reconstruction of DNA.

The DNA selected in STEP 107, the DNA generated by crossover in STEP 108, and the DNA generated by mutation in STEP 109 are synthesized (arrayed) as shown in FIG. 14, to generate DNA for optimizing the next time, namely a next generation.

STEP 111: Determination of Completion of Generation Change

The number n indicating a generation is advanced by one to n+1 (STEP 111), and when the generation number has not reached a predetermined generation number N (50 in this embodiment), the process shifts to STEP 104, and a process for searching an optimum value of a generation n+1 is executed.

When the generation number n exceeds the predetermined maximum value N though convergence of the optimization process is not confirmed in STEP 106, optimization is completed, and the process shifts to STEP 112.

STEP 112: Measurement and Recording of Output Rn by Most Excellent DNA

Figure 1:
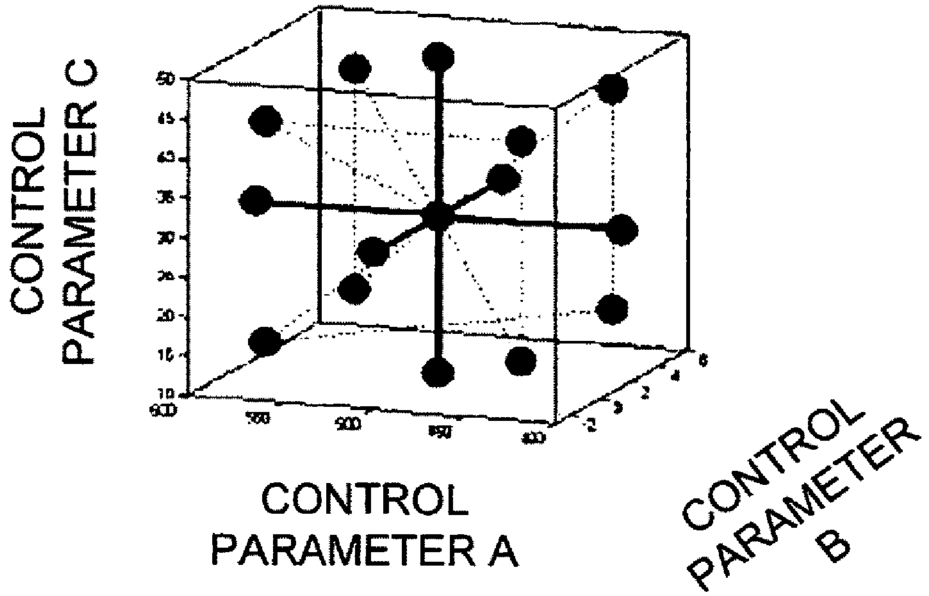
FIG. 1 is a view showing a combination of control parameter conditions in an experimental design method.
Figure 2:
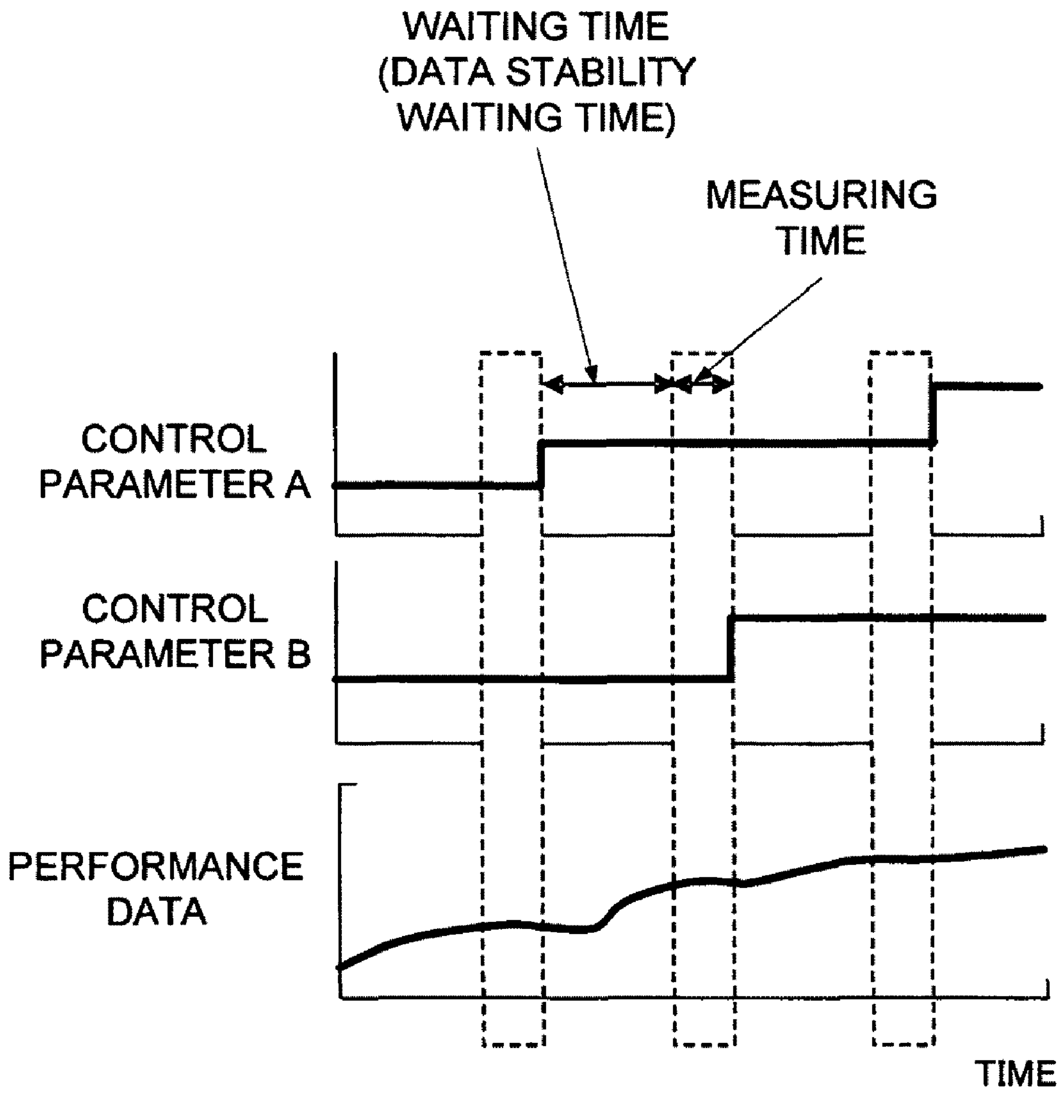
FIG. 2 is a view showing a conventional automatic measurement technique.

With the condition of the control parameters A, B and C [$A^{\#}$, $B^{\#}$ and $C^{\#}$ (final $A^{\#}$n, $B^{\#}$n and $C^{\#}$n)] that realizes the most excellent output $R^{\#}$ (final $R^{\#}$n), outputs are measured during a predetermined period of time, and an average value among those output is obtained. As shown in FIG. 2, the time for waiting for the outputs to be stabilized may be set.

Comparison of Simulations

Figure 15:
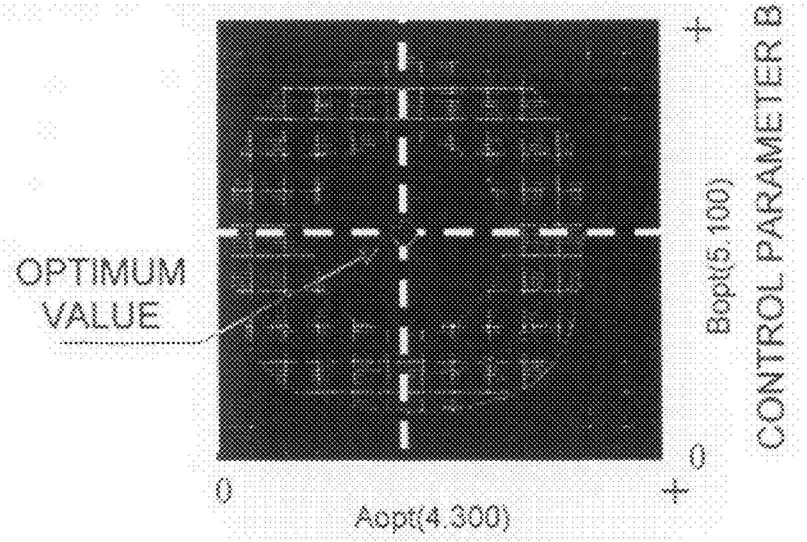
FIG. 15 is a view showing a single peak characteristic.
Figure 15:
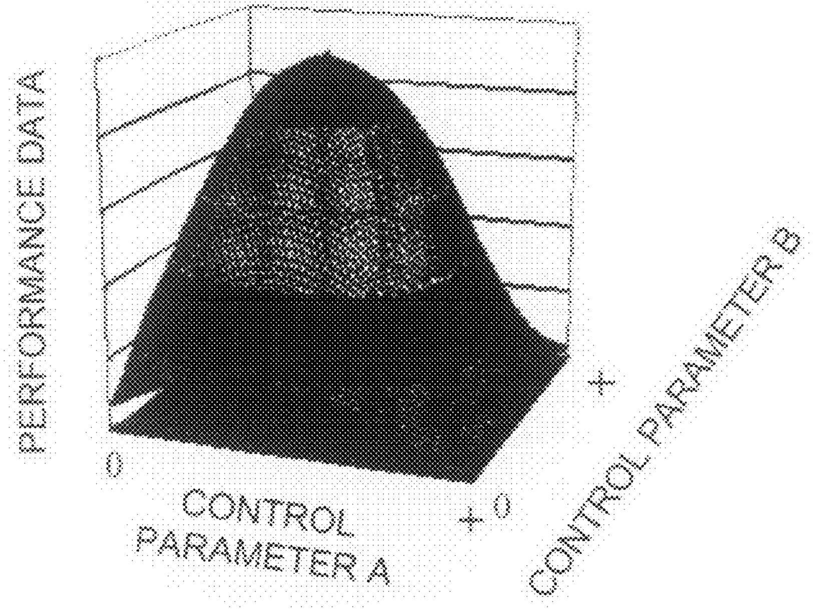
Figure 16:
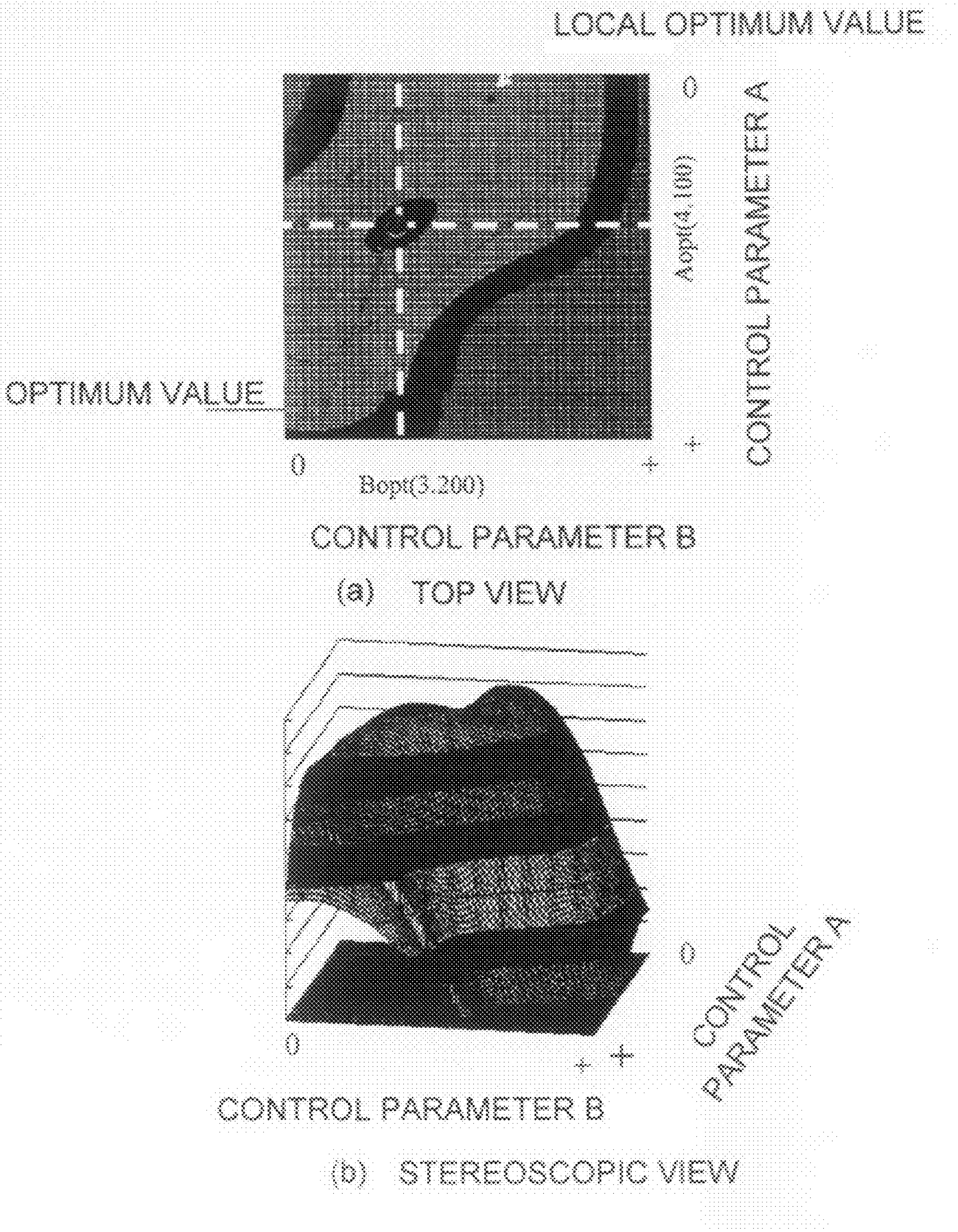
FIG. 16 is a view showing multiple peaks characteristic.
Figure 17:
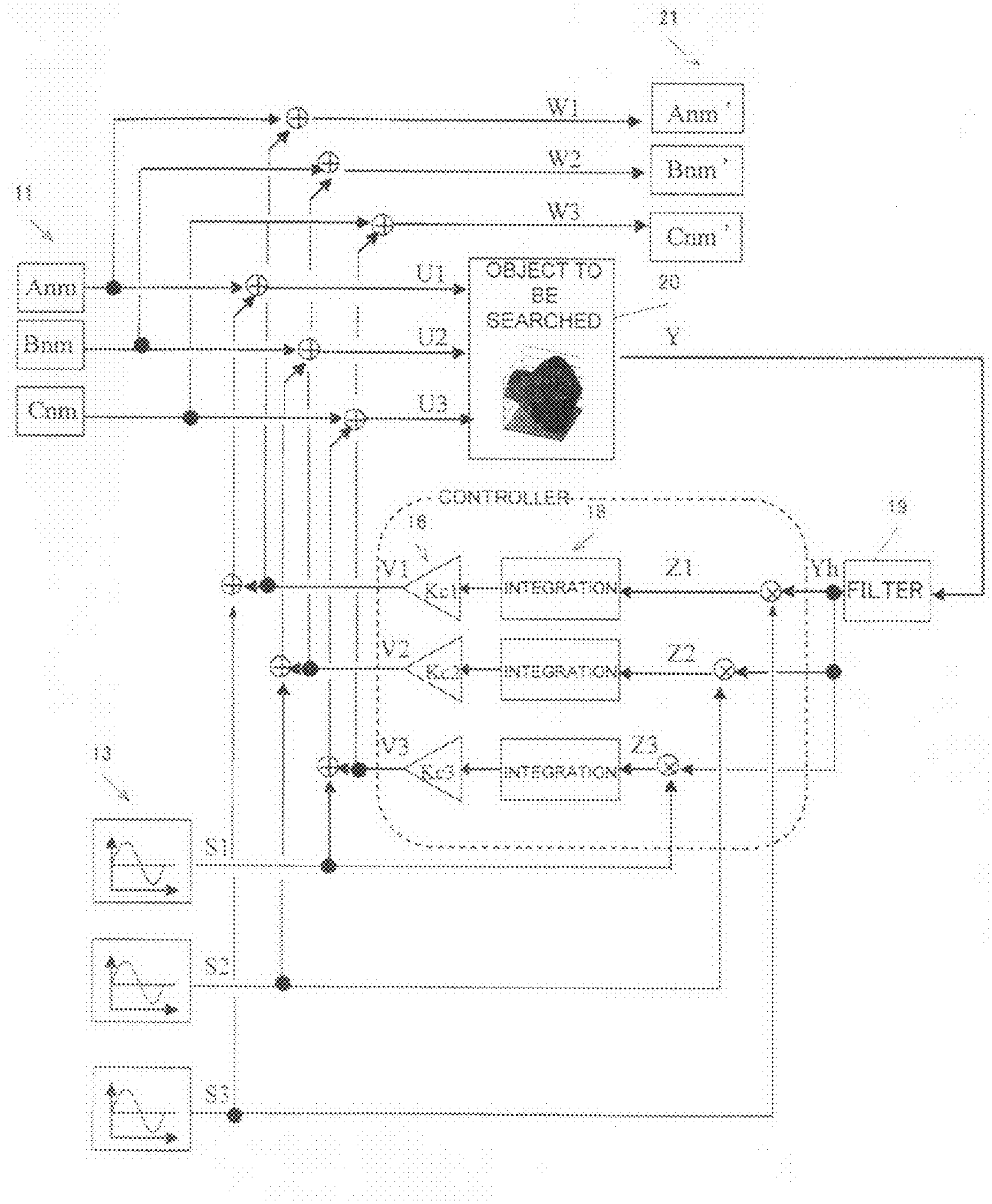
FIG. 17 is a view showing a system in which a genetic algorithm is applied to a conventional Extremum Seeking algorithm.

In order to verify the advantage of the new measurement algorithm in FIG. 7, search for optimum values in objects to be searched which respectively have a single peak characteristic and multiple peak characteristic as shown in FIGS. 15 and 16, where the control parameters for searching are two parameters A and B, were simulated in the following four patterns:

(1) Conventional Extremum Seeking method;

(2) New Extremum Seeking method using the correlation function method;

(3) Extremum Seeking having a configuration shown in FIG. 17 where the correlation function calculation is removed from the embodiment of the present invention shown in FIGS. 7 and 8, and the conventional technique is used (namely, integration of the conventional Extremum Seeking method and the genetic algorithm); and (4) Extremum Seeking of the embodiment of the present invention shown in FIGS. 7 and 8, using the genetic algorithm and the correlation function calculation Here, the determination in STEP 106 in FIG. 7 is halted, and the generation number N is set to 50. A configuration of a system that executes Extremum Seeking in (3) of the object to be compared is shown in FIG. 17.

Extremum Seeking Algorithm to be Compared

With reference to FIG. 17, an input to the object 20 to be searched is calculated by the following expressions:

$$U1(k)=V1(k)+S1(k)+Amn$$

$$U2(k)=V2(k)+S2(k)+Bmn$$

$$U3(k)=V3(k)+S3(k)+Cmn \quad (3\text{-}1)$$

Vi is a control input value (i=1 to 3) to a controller for an input Ui, and Si is a reference input. Here, Amn, Bmn and Cmn are generated by random numbers in ranges of values that the control parameters A, B and C may take.

The filter 19 calculates an output Yh in the following expression:

$$Yh(k)=-0.5Yh(k-1)+0.5Y(k) \quad (3\text{-}2)$$

The controller performs calculation of the following expression:

$$Zi(k) = Yh(k)Si(k-1) \quad (i = 1 \text{ to } 3) \quad (3\text{-}3)$$

$$Vi(k) = K_{ci}\sum_{j=0}^{k} Zi(j) \quad (3\text{-}4)$$

$K_{ci}$: Feedback gain

Results of Single Peak Characteristic

Figure 18:
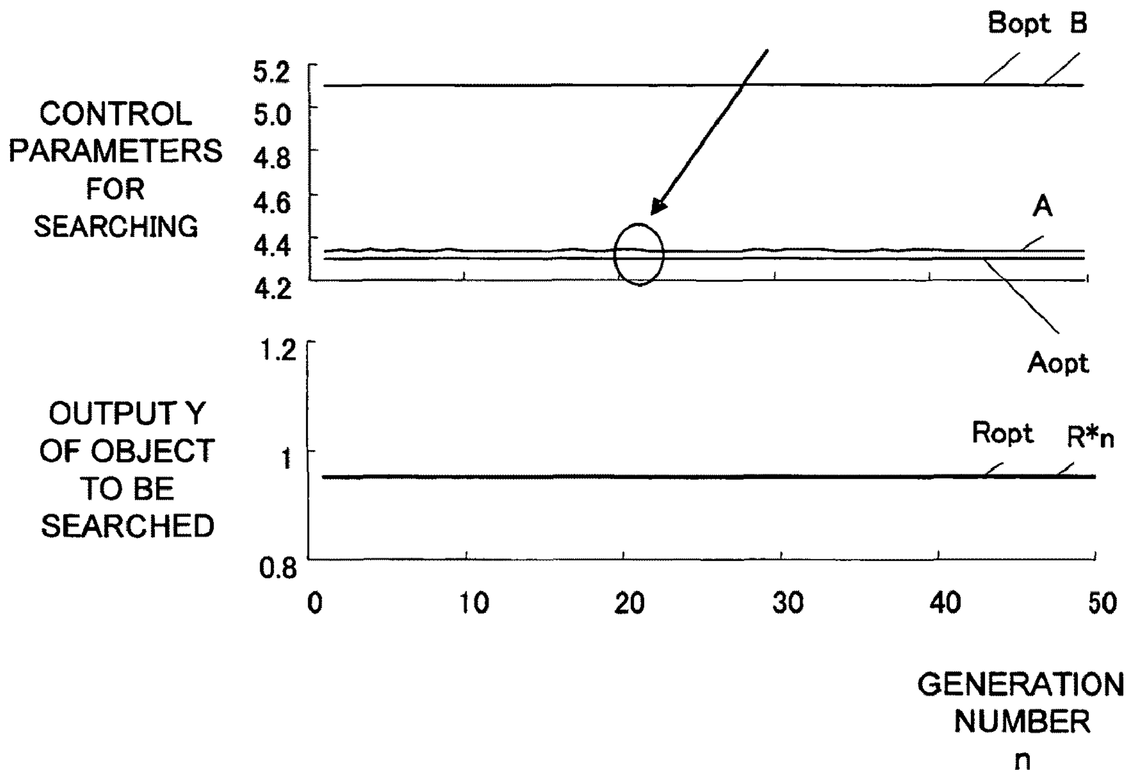
FIG. 18 is a view showing single peaks in typical Extremum Seeking.

FIG. 18 shows a characteristic in the case of searching an object having a single peak using conventional Extremum Seeking (1). A and B are search values (control parameters), and Aopt and Bopt are optimum values. R*n is a search value of an output Y of the object for search, and Ropt is an optimum value. As indicated by an arrow in the figure, swing (periodic behavior) of the reference signal causes fluctuation of the search value, and it is thus found that the search value has not completely converged.

Figure 19:
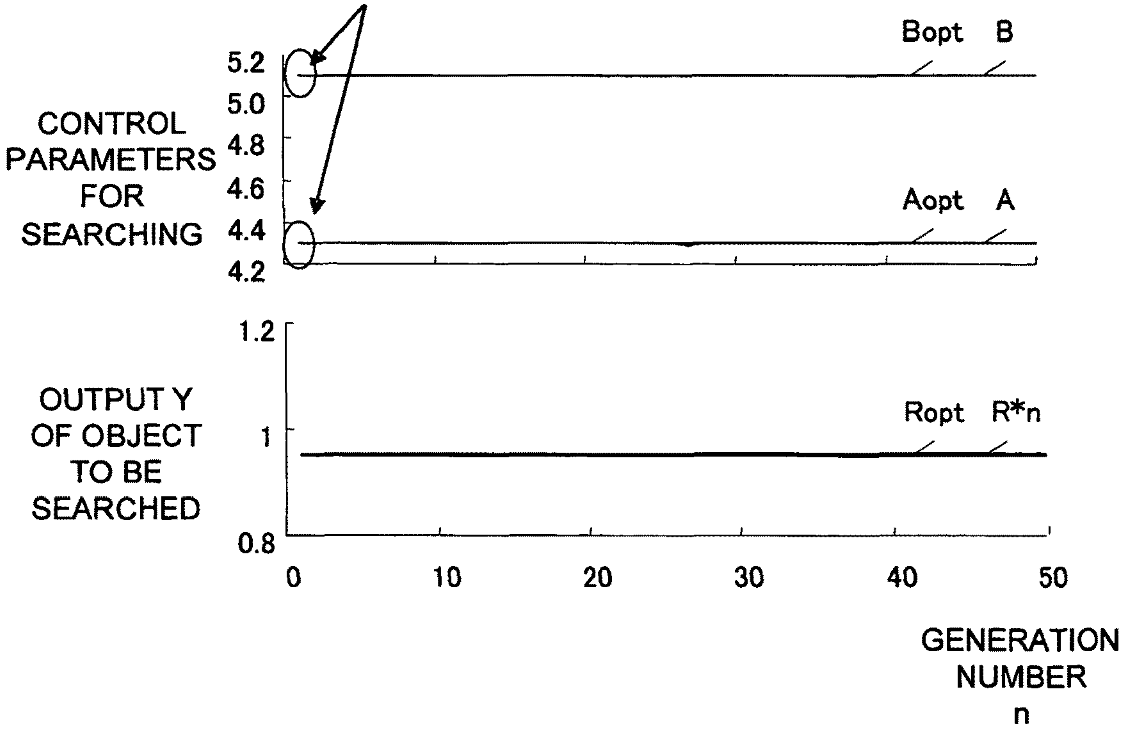
FIG. 19 is a view showing single peaks in Extremum Seeking in one embodiment of the present invention.

FIG. 19 shows a characteristic in the searching of the object having a single peak using Extremum Seeking (2) with the correlation function calculation. As indicated by arrows in the figure, it is found that the control parameters have converged to the optimum values after several generations.

In the results of Extremum Seeking in FIGS. 18 and 19, the output R#n of the object for search converged to the vicinity of the optimum value Ropt in both the conventional technique and the new technique. However, although the control parameters A and B of the new technique have converged to the optimum values Aopt and Bopt, the control parameter B according to the conventional technique has not completely converged. The conventional technique does not have a function of removing the periodic behavior of the reference signal from Vi as shown in FIG. 17 and Expressions 3-1 to 3-4. Hence the periodic behavior occurs in Wi, and affected by this, the convergence did not complete in the conventional method.

Figure 20:
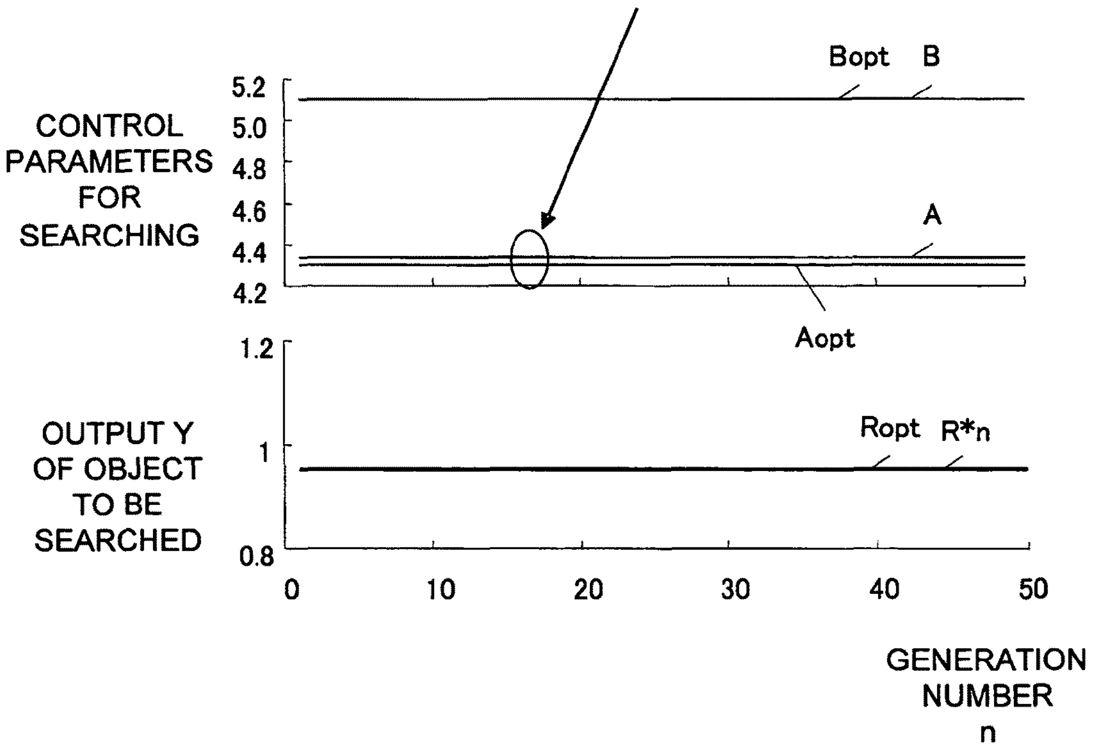
FIG. 20 is a view showing single peaks when Extremum Seeking of the algorithm in FIG. 7 is changed to a typical method.

FIG. 20 shows a characteristic of searching the object having a single peak using Extremum Seeking (3) with the configuration shown in FIG. 17 where the correlation function calculation is removed from the embodiment of the present invention shown in FIGS. 7 and 8. As indicated by an arrow in the figure, it is observed that the search value cannot completely converge because the swing of the reference signal (periodic behavior) causes fluctuation of the search value.

Figure 21:
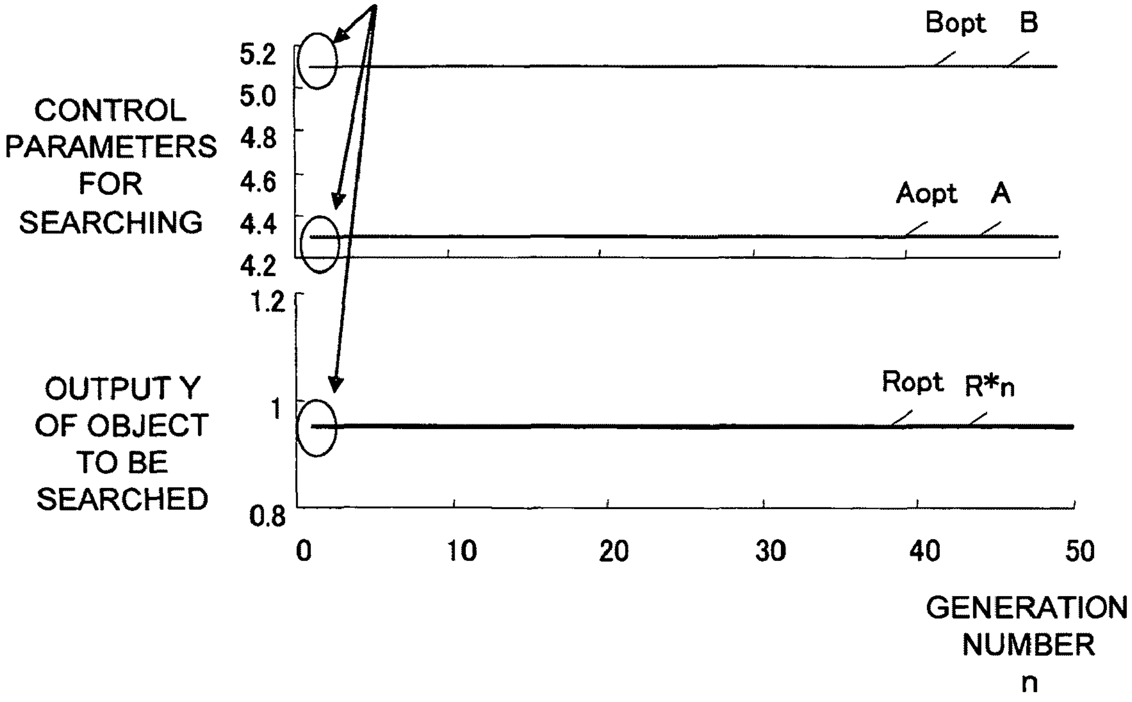
FIG. 21 is a view showing single peaks in the algorithm in FIG. 7.

FIG. 21 shows a characteristic of searching the object for search having a single peak using Extremum Seeking (4) with the genetic algorithm and the correlation function calculation shown in FIGS. 7 and 8. It is observed that the search value has converged after several generations.

While FIGS. 20 and 21 illustrate the results of the new algorithm, which is a combination of GA and Extremum Seeking as shown in FIG. 7. FIG. 20 relates to the conventional technique that uses Extremum Seeking not including the periodic function calculation, while FIG. 21 relates to the new technique using the correlation function calculation. As apparent from these figures, in both results, the output $R^{\#}n$ of the object for search has converged to the vicinity of the optimum value Ropt. The control parameters A and B in the new technique have converged to the optimum values Aopt and Bopt. The control parameter B in the conventional technique has not converged to Bopt as the periodic behavior of the reference signal affects Wi.

It is found from these results that the technique in FIG. 7 is far superior to the other techniques in terms of the speed and stability of convergence of the search values A and B.

Figure 26:
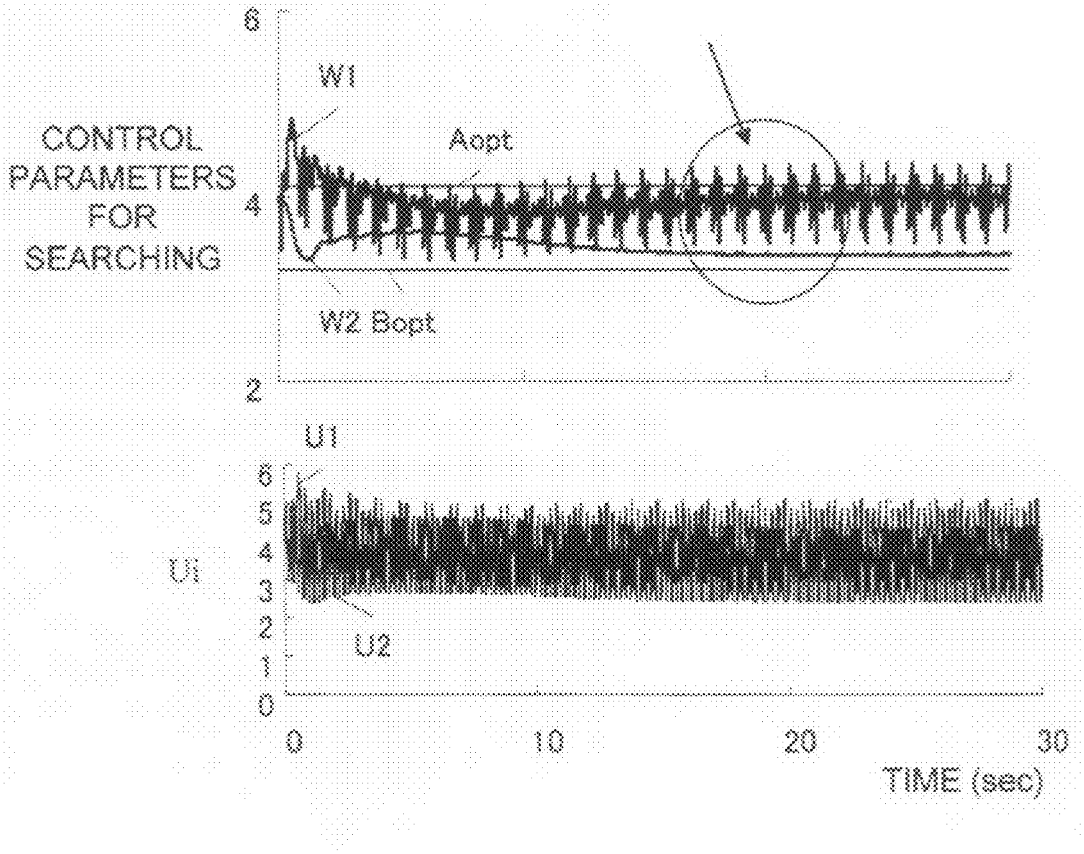
FIG. 26 is a view showing a convergence behavior of typical Extremum Seeking.
Figure 27:
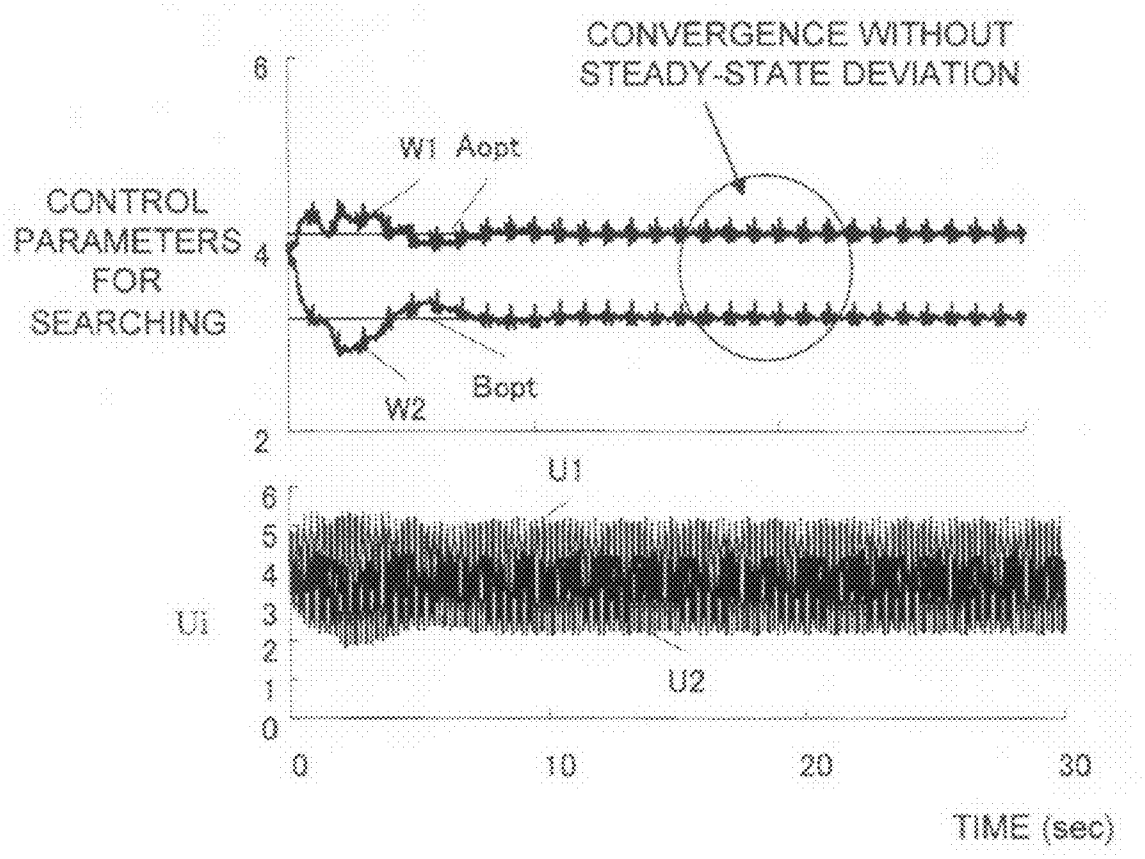
FIG. 27 is a view showing a convergence behavior of Extremum Seeking of one embodiment of the present invention.

FIGS. 26 and 27 illustrate comparison of search behaviors of the optimum value in the conventional Extremum Seeking and in the new Extremum Seeking. As apparent from the figures, in the conventional technique, the periodic behavior of the reference input has affected the search value Wi, leading to occurrence of stationary deviation of Wi with respect to the optimum value. On the other hand, in the new technique, since a moving average process is performed to prevent Wi from being affected by the periodic behavior of the reference input, Wi has converged without occurrence of stationary deviation with respect to the optimum value.

Results of Multiple Peak Characteristic

Figure 22:
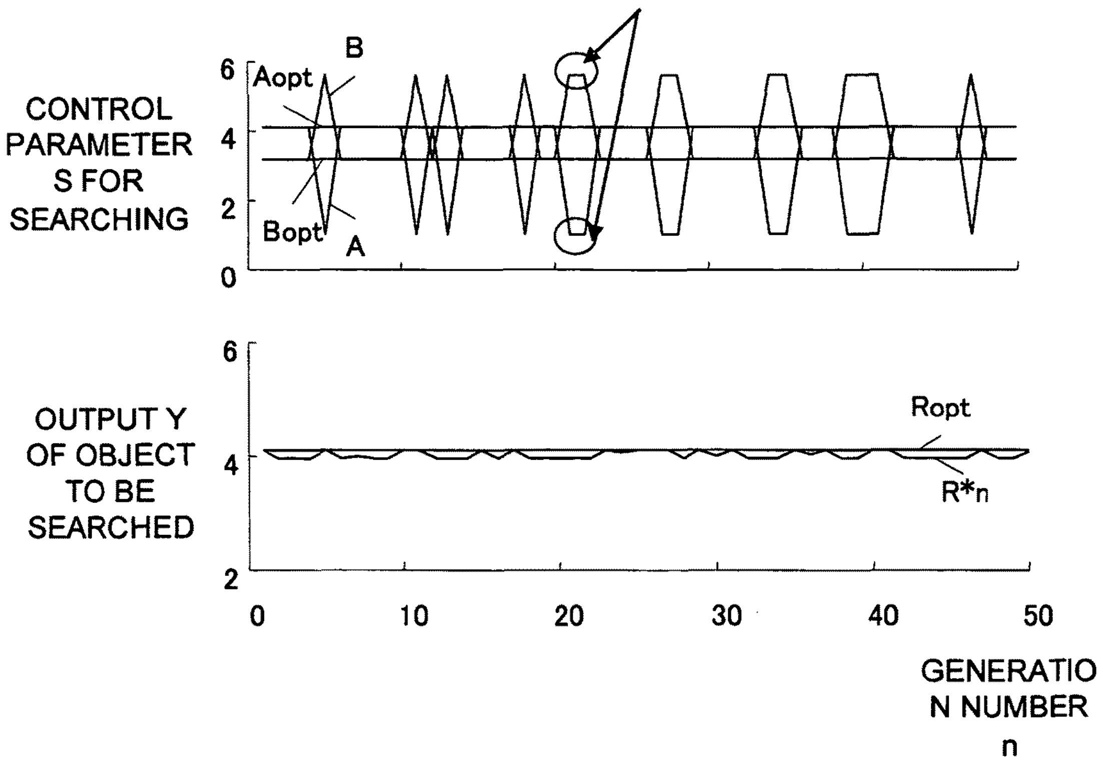
FIG. 22 is a view showing multiple peaks in typical Extremum Seeking.
Figure 23:
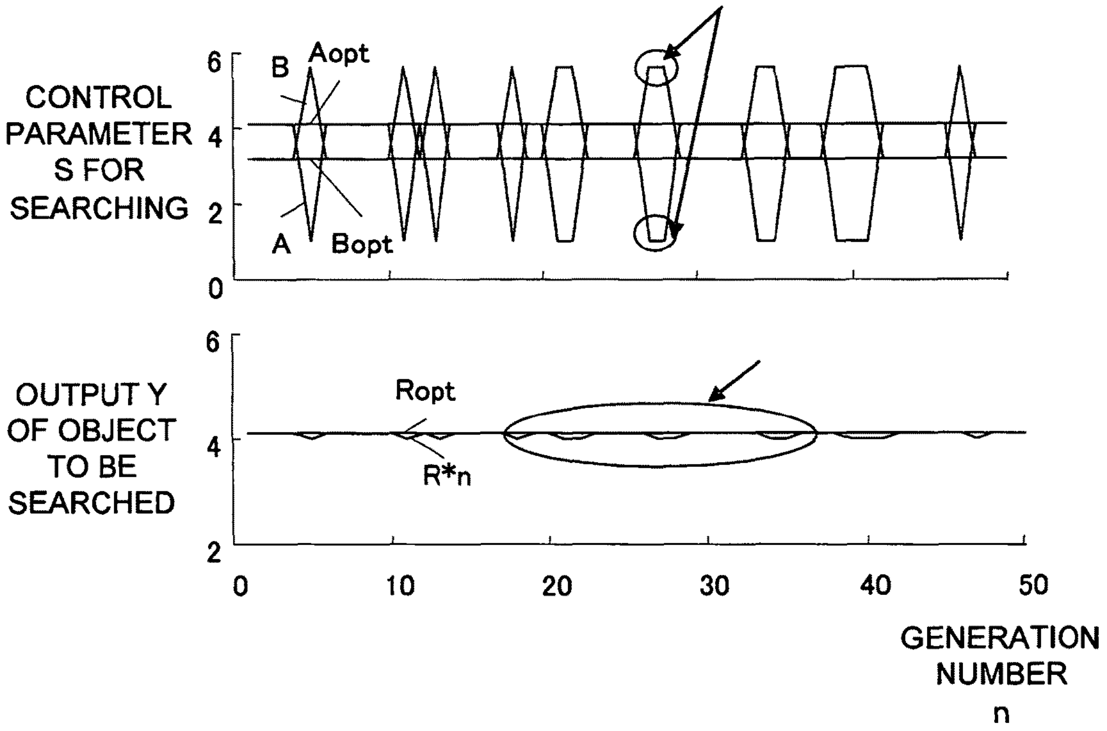
FIG. 23 is a view showing multiple peaks in Extremum Seeking of one embodiment of the present invention.

FIG. 22 illustrates results of simulations on the search of object as shown in FIG. 16 which has multiple peaks using the conventional Extremum Seeking method (1) while FIG. 23 illustrates results obtained using the new Extremum Seeking method (2) with the correlation function calculation. In these results, the initial value of the search value has been changed by a random number in both the conventional technique and in the new technique, but there are some cases where the search value converges to a local optimum value (local minimum) as indicated by arrows in the figure, depending upon the initial value.

When the conventional technique and the new technique are compared, as indicated by an arrow on a lower curved line in FIG. 23, the new technique is superior in the degree of convergence when the output has converged to an optimum value.

Figure 24:
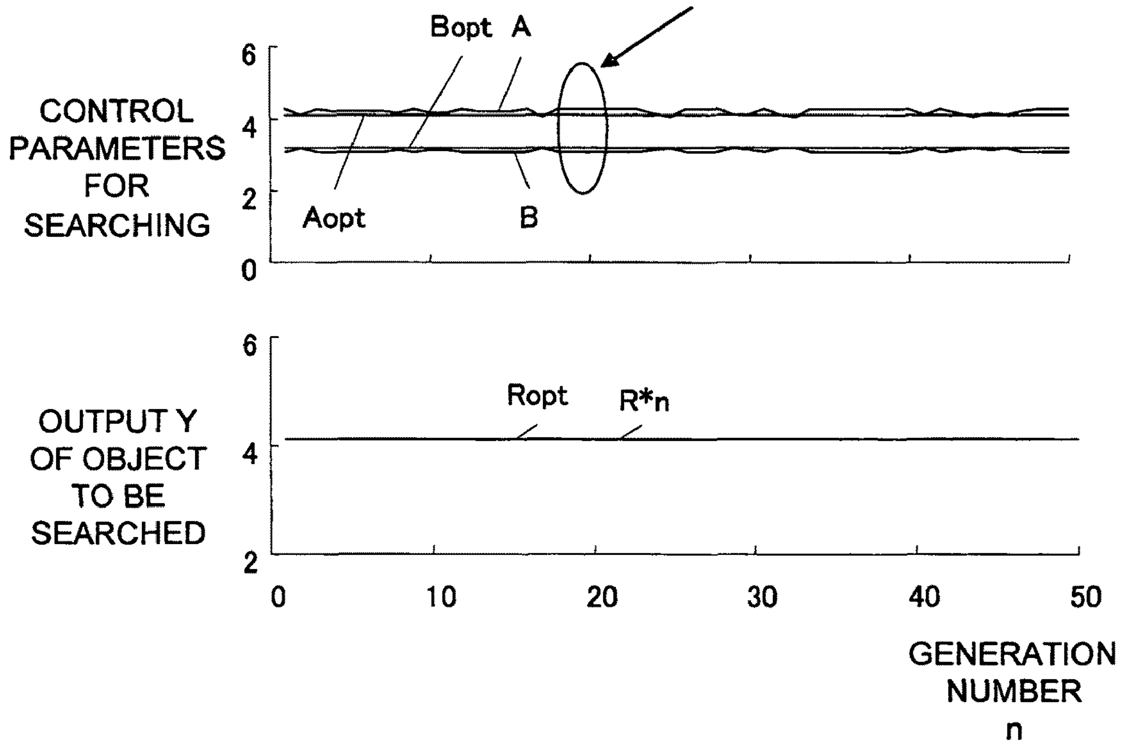
FIG. 24 is a view showing single peaks when Extremum Seeking of the algorithm in FIG. 7 is changed to a typical method.
Figure 25:
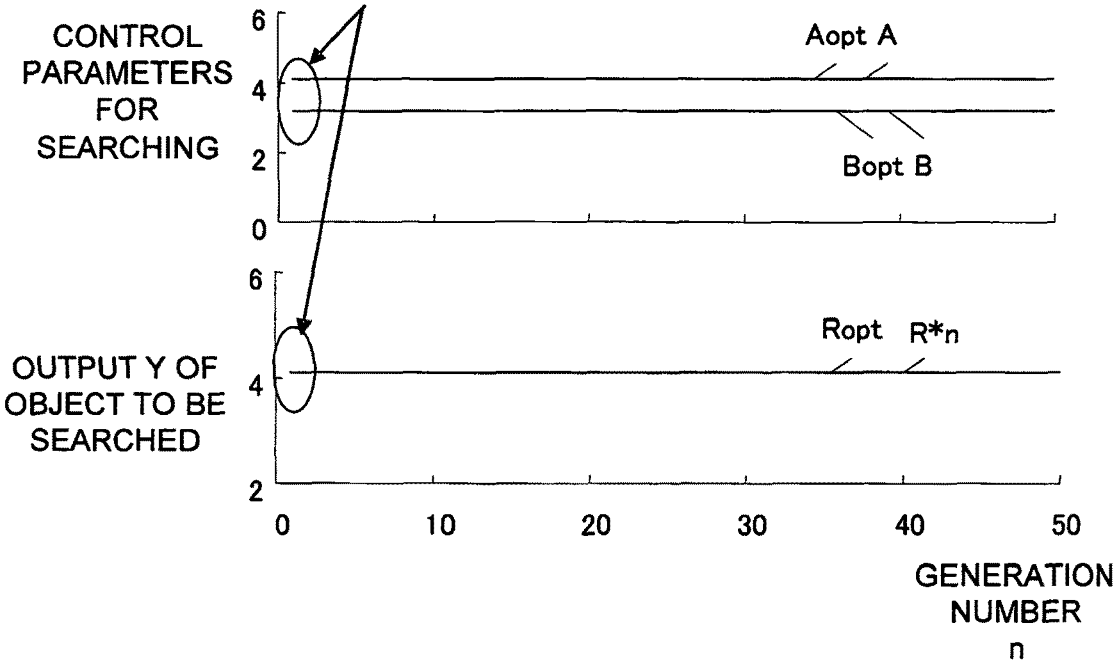
FIG. 25 is a view showing multiple peaks in the algorithm in FIG. 7.

FIG. 24 illustrates results of search of an object having multiple peaks using the Extremum Seeking method with the configuration shown in FIG. 17. The correlation function calculation is removed from the embodiment of the present invention shown in FIGS. 7 and 8 and the conventional technique is used (namely, the mode of integration of the conventional Extremum Seeking method and the genetic algorithm). FIG. 25 is a result of search of the object having multiple peaks using the Extremum Seeking method according to the embodiment of the present invention where the genetic algorithm and the correlation function calculation shown in FIGS. 7 and 8 are used.

As apparent from the figures, in both results, the output $R^{*}n$ of the object has converged to the vicinity of the optimum value Ropt. However, the control parameters A and B have converged to the optimum values Aopt and Bopt in the new technique, whereas in the conventional technique, the control parameters A and B did not completely converge to the optimum values Aopt and Bopt as shown in places indicated by arrows on upper curved lines in FIG. 24 as the foregoing periodic behavior of the reference signal affects Wi.

It is found from these results that the technique in FIG. 7 is far superior to the other conventional techniques in terms of the speed and stability of convergence of the search values A and B, and is also capable of searching an optimum value even when the object for search has a local optimum value, without convergence to the local optimum value.

Embodiment of Derivation

As described above, a recently used gasoline/diesel-powered engine is provided with a large number of control parameters. Hence the automatic measurement algorithm shown in FIG. 7 is effective for obtaining a performance characteristic of the engine in a short period of time.

Figure 3:
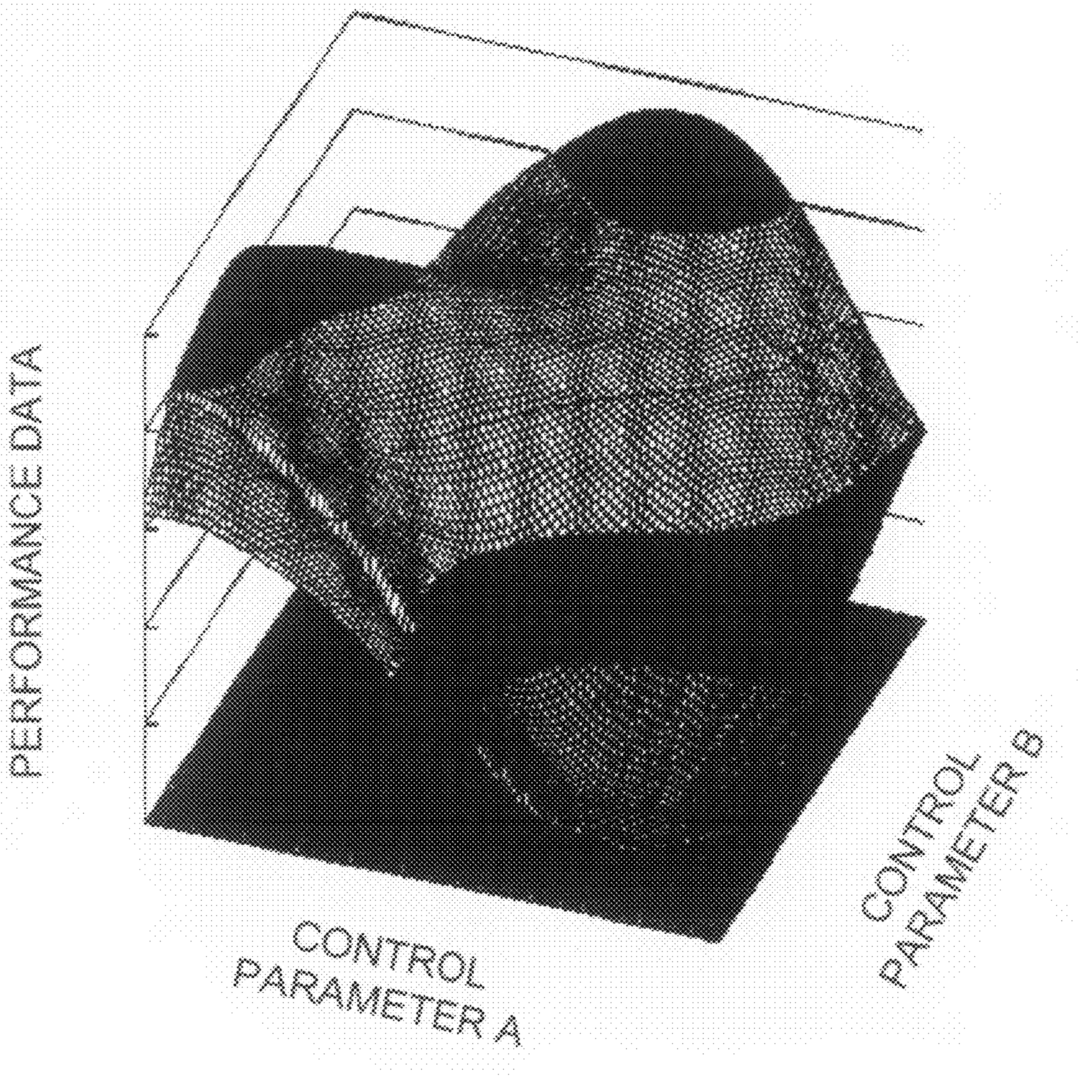
FIG. 3 is a view showing an engine performance characteristic.
Figure 4:
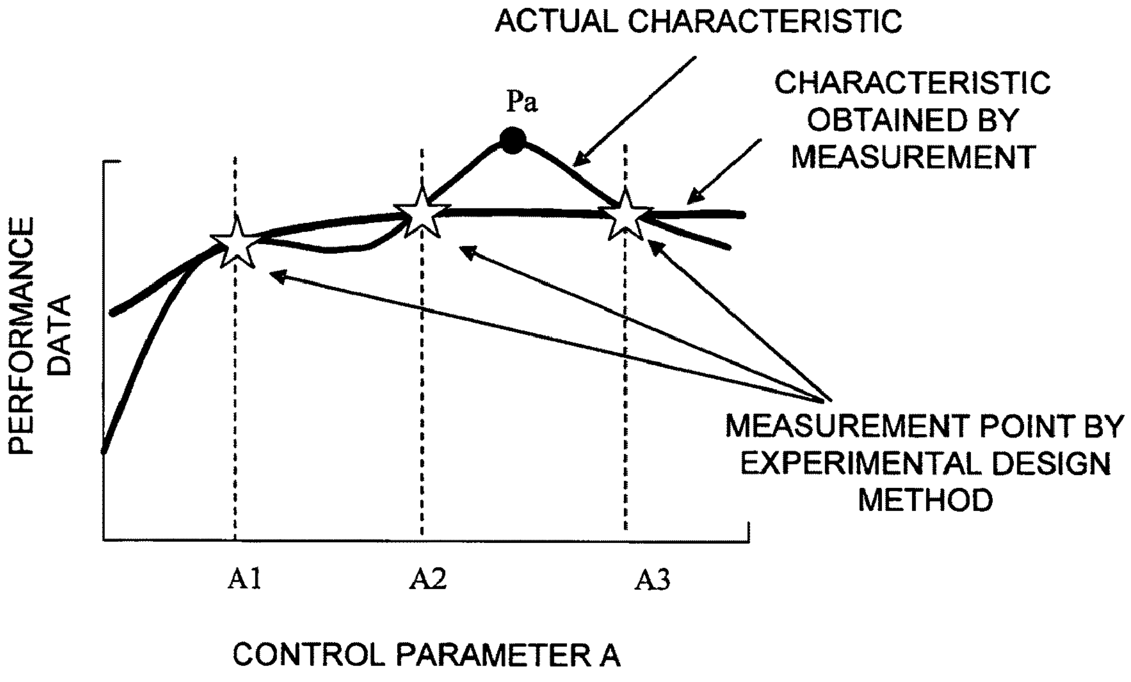
FIG. 4 is a view showing an adverse effect of reduction in number of measurement points by the use of the experimental design method.
Figure 5:
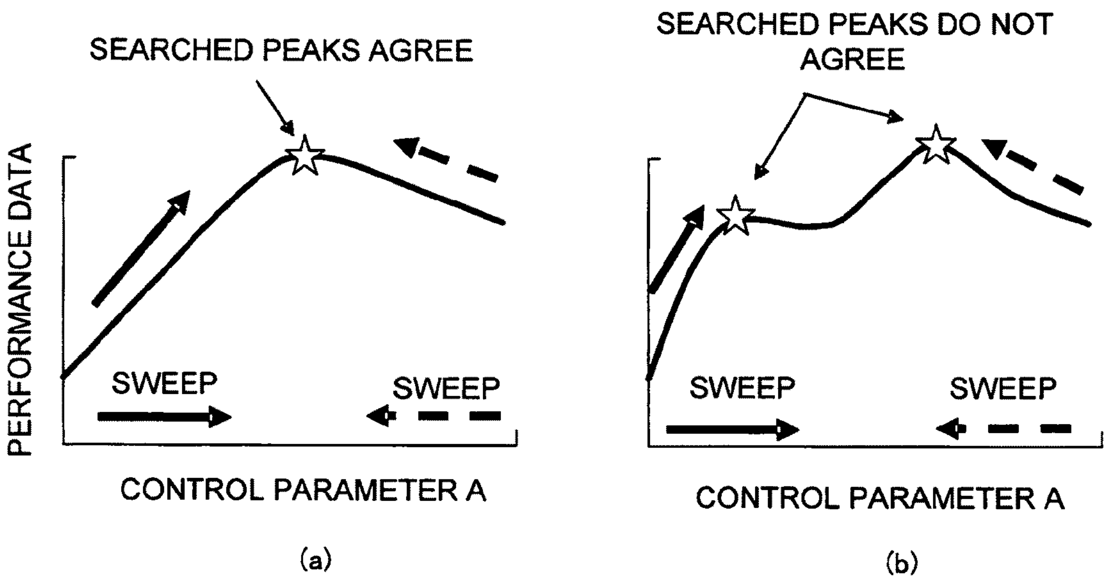
FIG. 5 is a view showing a problem of a conventional sweep method.

Meanwhile, the engine performance characteristic obtained by the automatic measurement algorithm is often given as a response curved surface having a sophisticated local optimum value as shown in FIG. 3. Therefore it is highly difficult to predetermine the control parameters in a map or the like so as to keep the engine performance in an optimal manner for all operating conditions.

Accordingly, an approach can be considered in which an optimization process is successively performed while engine control is performed using the obtained engine performance as an engine model (response curved surface model), to determine control parameter values.

One of such an approach is a model prediction control. However, an optimization algorithm (QP method, etc.) of typical model prediction control is performed on the assumption that an object for search has no quadratically functional local optimum value. Therefore, when a local optimum value exists, it is not ensured that a control input is given as one capable of realizing a global optimum value.

Figure 28:
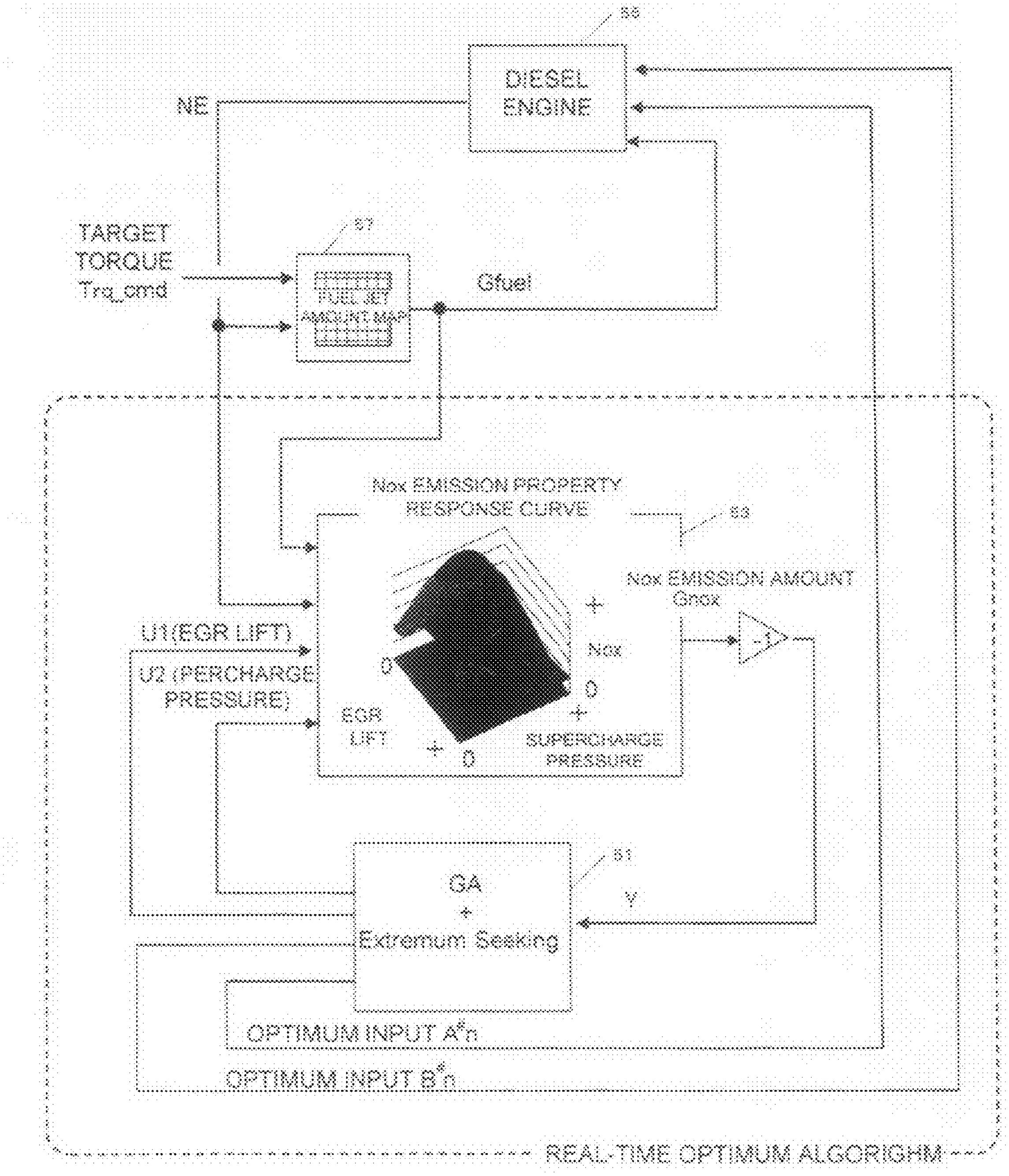
FIG. 28 is a view showing a real-time optimal engine control system.

Accordingly, in the present invention, a real-time optimization engine control system, shown in FIG. 28, is proposed as an embodiment for applying the automatic measurement algorithm in FIG. 7. An optimization algorithm executing unit 51 in the engine control in FIG. 28 uses the algorithm of STEPS 104 to 111 in FIG. 7. The control parameters A and B for searching are an EGR lift and supercharge pressure, respectively, and an output of an object 53 for search is −Gnox obtained by inverting a Nox emission amount into minus. The optimization algorithm executing unit 51 issues a command to an engine 55 with the values A# and B# obtained by this search being an optimum EGR lift and an optimum supercharge pressure respectively.

In the engine control system shown in FIG. 28, in the diesel engine 55, a fuel jet amount Gfuel is determined with reference to a fuel jet amount map 57 in accordance with a torque requested by a driver, and simultaneously, the EGR lift and the supercharge command value are real-time optimized by the optimization algorithm executing unit 51 so as to minimize emission of Nox.

The curved surface 53 of Nox emission response, the object for search, changes in accordance with the engine rotational speed NE and the fuel jet amount Gfuel. The optimization calculation does not fail as long as the real-time optimization algorithm is performed within a cyclic period of calculating the fuel jet amount Gfuel and the engine rotational speed NE.

Though the present invention has been described with regard to the specific embodiments, the present invention is not limited to such embodiments.

What is claimed is:

1. A computer program embodied on a non-transitory computer-readable medium for searching for control parameters (Amn, Bmn, Cmn) that maximize output (Y) of a search object, the search object producing output (Y) responsive to the control parameters (Amn, Bmn, Cmn), said computer program when executed on a computer performs:

providing starting values of m said control parameters (Amn, Bmn, Cmn) in accordance with an algorithm that renews generations;

repeating search cycles for each of said m control parameters (Amn, Bmn, Cmn) and, in each search cycle, adding a periodic function (S1, S2, S3) of a predetermined period and a correction value (V1, V2, V3) obtained in a previous search cycle to the control parameters (Amn, Bmn, Cmn) to provide input parameters (U1, U2, U3) to said search object;

multiplying, in said each search cycle, an output (Y) obtained from said search object responsive to said input parameters (U1, U2, U3) by said periodic function (S1, S2, S3) and calculating said new correction value (V1, V2, V3) for correcting an integral value of a value (Zi) obtained by the multiplication such that said integral value converges; and terminating repetition of the search cycle when said control parameters (Amn, Bmn, Cmn) converge or when a predetermined time elapsed, and determining m search values (Amn', Bmn', Cmn') that are values of said m control parameters (Amn, Bmn, Cmn) corrected by said correction values at the termination of repetition of search cycles with respect to each of said m control parameters (Amn, Bmn, Cmn), wherein said providing starting values comprises providing starting values for a next generation based on said m search values (Amn', Bmn', Cmn'), and when said m search values converge or when a predetermined number of generations has been reached, outputting said m search values as optimum control parameters.

2. The computer program according to claim 1, wherein an integration period of said integral value is an integral multiple of a period of said periodic function.

3. The computer program according to claim 1, wherein said periodic function has different periods for a plurality of said control parameters, and an integration period of said integral value is a time period of a common multiple of periods of all said periodic functions.

4. The computer program according to claim 1, wherein said algorithm that renews generations updating generations is a genetic algorithm.

5. The computer program according to claim 1, wherein a genetic algorithm constructs next generation parameters using said input parameters that maximizes the output of said search object, the output being searched based on current generation parameters.

6. A control system for an internal combustion engine having an optimizing algorithm performing unit for controlling the internal combustion engine, the optimizing algorithm being formed by the computer program according to claim 1, wherein the search values obtained by the optimizing algorithm performing unit are entered to the internal combustion engine.

7. A computer implemented method for searching for control parameters (Amn, Bmn, Cmn) that maximize output (Y) of object, the object producing output (Y) responsive to the control parameters (Amn, Bmn, Cmn), said method comprising:

providing starting values of m said control parameters (Amn, Bmn, Cmn) in accordance with an algorithm that renews generations;

repeating search cycles for each of said m control parameters (Amn, Bmn, Cmn) and, in each search cycle, adding a periodic function (S1, S2, S3) of a predetermined period and a correction value (V1, V2, V3) obtained in a previous search cycle to the control parameters (Amn, Bmn, Cmn) to provide input parameters (U1, U2, U3) to said search object;

multiplying, in said each search cycle, an output (Y) obtained from said search object responsive to said input parameters (U1, U2, U3) by said periodic function (S1, S2, S3) and calculating said new correction value (V1, V2, V3) for correcting an integral value of a value (Zi) obtained by the multiplication such that said integral value converges; and terminating repetition of the search cycle when said control parameters (Amn, Bmn, Cmn) converge or when a predetermined time elapsed, and determining m search values (Amn', Bmn', Cmn') that are values of said m control parameters (Amn, Bmn, Cmn) corrected by said correction values at the termination of repetition of search cycles with respect to each of said m control parameters (Amn, Bmn, Cmn), wherein said providing starting values comprises providing starting values for the next generation based on said m search values (Amn', Bmn', Cmn'), and when said m search values converge or when a predetermined number of generations has been reached, outputting said m search values as optimum control parameters.

8. The method according to claim 7, wherein an integration period of said integral value is an integral multiple of a period of said periodic function.

9. The method according to claim 7, wherein said periodic function has different periods for a plurality of said control parameters, and an integration period of said integral value is a time period of a common multiple of periods of all said periodic functions.

10. The method according to claim 7, wherein said algorithm that renews generations updating generations is a genetic algorithm.

11. The method according to claim 7, wherein a genetic algorithm constructs next generation parameters using said input parameters that maximizes the output of said object, the output being searched based on current generation parameters.

12. A control system for an internal combustion engine having an optimizing algorithm performing unit for controlling the internal combustion engine, the optimizing algorithm being formed by the method according to claim 7, wherein the search values obtained by the optimizing algorithm performing unit are entered to the internal combustion engine.

13. A system, comprising:

a processor; and a memory, wherein the processor is configured to search for control parameters (Amn, Bmn, Cmn) that maximize output (Y) of object, wherein the object produces output (Y) responsive to the control parameters (Amn, Bmn, Cmn), provide starting values of m said control parameters (Amn, Bmn, Cmn) in accordance with an algorithm that renews generations, repeat search cycles for each of said m control parameters (Amn, Bmn, Cmn) and, in each search cycle, add a periodic function (S1, S2, S3) of a predetermined period and a correction value (V1, V2, V3) obtained in a previous search cycle to the control parameters (Amn, Bmn, Cmn) to provide input parameters (U1, U2, U3) to said search object, multiply, in said each search cycle, an output (Y) obtained from said search object responsive to said input parameters (U1, U2, U3) by said periodic function (S1, S2, S3), calculate said new correction value (V1, V2, V3) for correcting an integral value of a value (Zi) obtained by the multiplication such that said integral value converges; and terminate repetition of the search cycle when said control parameters (Amn, Bmn, Cmn) converge or when a predetermined time elapsed, and determining m search values (Amn', Bmn', Cmn') that are values of said m control parameters (Amn, Bmn, Cmn) corrected by said correction values at the termination of repetition of search cycles with respect to each of said m control parameters (Amn, Bmn, Cmn), wherein said providing starting values comprises providing starting values for the next generation based on said m search values (Amn', Bmn', Cmn'), and when said m search values converge or when a predetermined number of generations has been reached, outputting said m search values as optimum control parameters.

14. The system according to claim 13, wherein an integration period of said integral value is an integral multiple of a period of said periodic function.

15. The system according to claim 13, wherein said periodic function has different periods for a plurality of said control parameters, and an integration period of said integral value is a time period of a common multiple of periods of all said periodic functions.

16. The system according to claim 13, wherein said algorithm that renews generations updating generations is a genetic algorithm.

17. The system according to claim 13, wherein a genetic algorithm constructs a next generation parameters using said input parameters that maximizes the output of said object, the output being searched based on a current generation parameters.

18. A control system for an internal combustion engine having an optimizing algorithm performing unit for controlling the internal combustion engine, the optimizing algorithm performing unit comprising the system according to claim 13, wherein the search values obtained by the optimizing algorithm performing unit are entered to the internal combustion engine.

* * * * *